US011017350B1

(12) United States Patent
De Bonet et al.

(10) Patent No.: US 11,017,350 B1
(45) Date of Patent: *May 25, 2021

(54) INTERPOSERS FOR CONVERTING TRADITIONAL SHELVES INTO SMART SHELVES

(71) Applicant: Amazon Technologies, Inc., Seattle, WA (US)

(72) Inventors: Jeremy Samuel De Bonet, Southborough, MA (US); Nicholas Charles McMahon, Bolton, MA (US); Jacob Alex Siegel, Marlborough, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/841,376

(22) Filed: Apr. 6, 2020

Related U.S. Application Data

(63) Continuation of application No. 16/179,750, filed on Nov. 2, 2018, now Pat. No. 10,614,415, which is a
(Continued)

(51) Int. Cl.
*G06Q 10/08* (2012.01)
*G01L 5/00* (2006.01)
(Continued)

(52) U.S. Cl.
CPC .......... *G06Q 10/087* (2013.01); *A47B 57/34* (2013.01); *A47B 57/406* (2013.01);
(Continued)

(58) Field of Classification Search
CPC .. G06Q 10/087; G06Q 10/08; G06Q 30/0617; A47B 57/34; A47B 57/406; A47B 96/028
See application file for complete search history.

(56) References Cited

U.S. PATENT DOCUMENTS 7,225,980 B2   6/2007   Ku et al.
7,949,568 B2   5/2011   Fano et al.
(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.
(Continued)

*Primary Examiner* — Changhyun Yi
(74) *Attorney, Agent, or Firm* — Athorus, PLLC

(57) ABSTRACT

Interposer assemblies may be inserted between a traditional shelf and traditional supports for the shelf. Each of the interposer assemblies may be configured to generate signals corresponding to changes in loading on the traditional shelf, and information regarding the changes may be determined to identify items placed onto or removed from the traditional shelf, and locations at which the items were placed or from which the items were removed. The interposer assemblies may include one or more load cells, such as strain-gage load cells, and analog signals generated by the load cells may be processed to determine a mass of an item placed on the shelf or removed therefrom. The item, and a location corresponding to the item, may be determined based on the mass and according to standard equilibrium procedures.

20 Claims, 16 Drawing Sheets

Related U.S. Application Data continuation of application No. 14/981,199, filed on Dec. 28, 2015, now Pat. No. 10,121,121.

(51) Int. Cl.

| | |
|---|---|
| *G01G 19/52* | (2006.01) |
| *G01G 19/414* | (2006.01) |
| *G01G 19/42* | (2006.01) |
| *G01G 21/28* | (2006.01) |
| *G01G 21/23* | (2006.01) |
| *A47B 57/40* | (2006.01) |
| *A47B 57/34* | (2006.01) |
| *A47B 96/02* | (2006.01) |
| *A47B 96/06* | (2006.01) |
| *A47B 57/42* | (2006.01) |

(52) U.S. Cl.
CPC ......... *A47B 96/028* (2013.01); *G01G 19/414* (2013.01); *G01G 19/4144* (2013.01); *G01G 19/42* (2013.01); *G01G 19/52* (2013.01); *G01G 21/23* (2013.01); *G01G 21/28* (2013.01); *G01L 5/00* (2013.01); *A47B 57/42* (2013.01); *A47B 96/027* (2013.01); *A47B 96/061* (2013.01)

(56) References Cited

U.S. PATENT DOCUMENTS

| | | |
|---|---|---|
| 8,009,864 B2 | 8/2011 | Linaker et al. |
| 8,175,925 B1 | 5/2012 | Rouaix |
| 8,189,855 B2 | 5/2012 | Opalach et al. |
| 8,423,431 B1 | 4/2013 | Rouaix et al. |
| 8,630,924 B2 | 1/2014 | Groenevelt et al. |
| 8,688,598 B1 | 4/2014 | Shakes et al. |
| 9,473,747 B2 | 10/2016 | Kobres et al. |
| 10,121,121 B1 * | 11/2018 | De Bonet ............ A47B 57/406 |
| 10,614,415 B1 * | 4/2020 | De Bonet ................ G01L 5/00 |
| 2003/0002712 A1 | 1/2003 | Steenburgh et al. |
| 2004/0181467 A1 | 9/2004 | Raiyani et al. |
| 2008/0055087 A1 | 3/2008 | Horii et al. |
| 2008/0077511 A1 | 3/2008 | Zimmerman |
| 2008/0109114 A1 | 5/2008 | Orita et al. |
| 2009/0121017 A1 | 5/2009 | Cato et al. |
| 2009/0245573 A1 | 10/2009 | Saptharishi et al. |
| 2011/0011936 A1 | 1/2011 | Morandi et al. |
| 2012/0284132 A1 | 11/2012 | Kim et al. |
| 2013/0076898 A1 | 3/2013 | Philippe et al. |
| 2013/0253700 A1 | 9/2013 | Carson et al. |
| 2014/0201042 A1 * | 7/2014 | Meyer ................ G06Q 10/087 705/28 |
| 2014/0224875 A1 | 8/2014 | Slesinger et al. |
| 2014/0279294 A1 | 9/2014 | Field-Darragh et al. |
| 2014/0362223 A1 | 12/2014 | LaCroix et al. |
| 2015/0019391 A1 | 1/2015 | Kumar et al. |
| 2015/0073907 A1 | 3/2015 | Purves et al. |
| 2015/0083744 A1 | 3/2015 | Vogler et al. |
| 2016/0048798 A1 | 2/2016 | Meyer et al. |
| 2016/0328767 A1 | 11/2016 | Bonner et al. |
| 2017/0147969 A1 | 5/2017 | Narsingh et al. |
| 2017/0172315 A1 | 6/2017 | Hay |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner $(F_{LB} + F_{LF} + F_{RB} + F_{RF}) = 12.900N$

TOTAL MASS = 1.315 kg

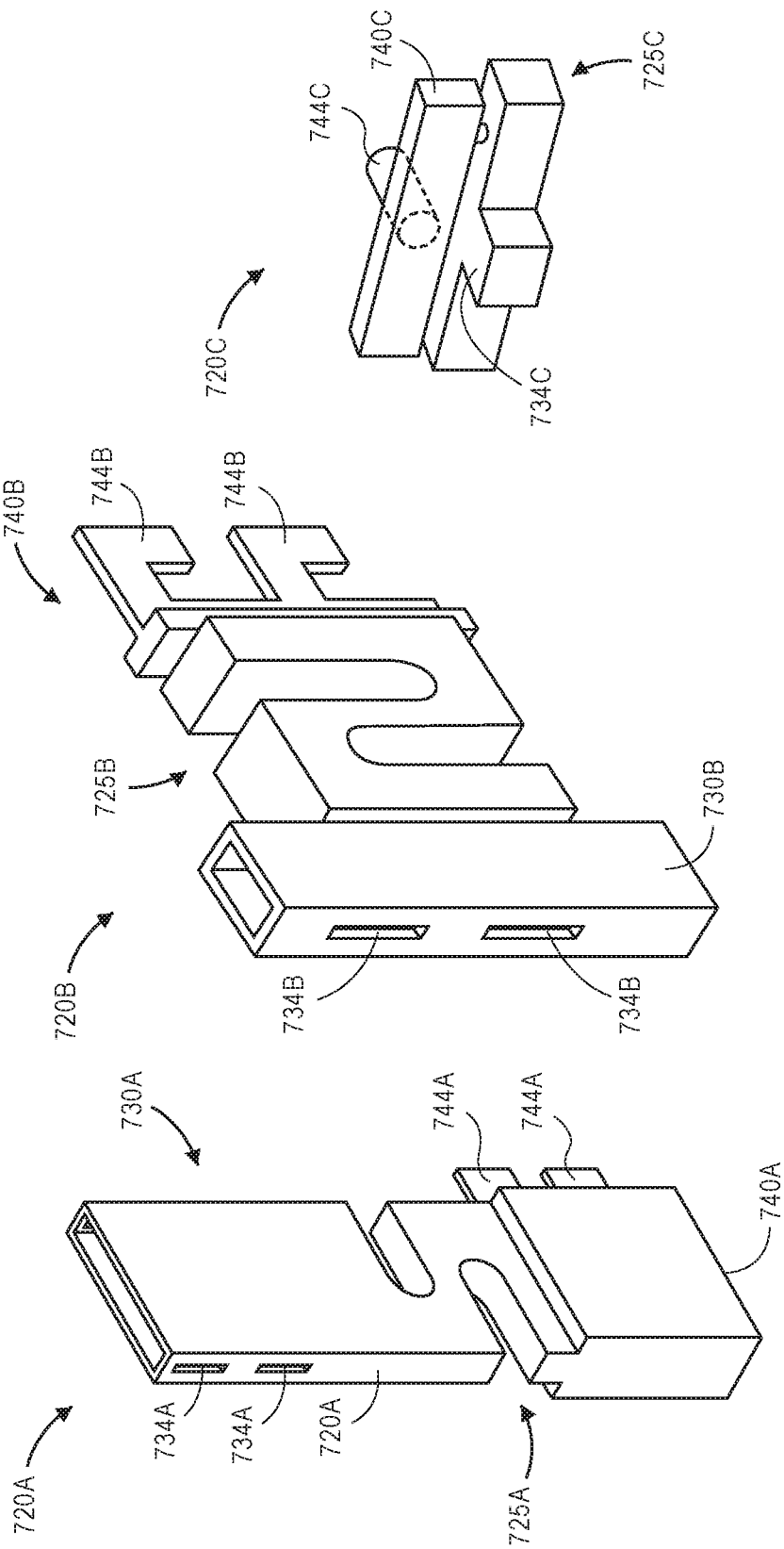

INTERPOSERS FOR CONVERTING TRADITIONAL SHELVES INTO SMART SHELVES

CROSS-REFERENCE TO RELATED APPLICATIONS

This application is a continuation of U.S. patent application Ser. No. 16/179,750, filed Nov. 2, 2018, now U.S. Pat. No. 10,614,415, which is a continuation of U.S. patent application Ser. No. 14/981,199, filed Dec. 28, 2015, now U.S. Pat. No. 10,121,121. The contents of each of these applications are incorporated by reference herein in their entirety.

BACKGROUND

Materials handling facilities such as warehouses or retail stores often store or display items on shelves. For example, a materials handling facility may include structural features such as walls, gondola racks or fixtures to which one or more shelves may be mounted or from which such shelves may be suspended, and available items may be disposed upon such shelves. Available items may remain on shelves on a temporary basis, until one or more of the items thereon is desired (e.g., in response to an order or a request from one or more users of the materials handling facility).

Storing items on shelves or like elements provides a number of advantages to users of a materials handling facility. For example, an item having one or more flat surfaces may be stored individually or collectively (e.g., along with other like or identical items), by placing one or more of the flat surfaces of such items on a corresponding flat surface of a shelf or like element. Furthermore, items may be stored in random locations on a shelf, or in predetermined areas or spaces of the shelf that are set aside for items of a specific type, group or category.

A shelf may be utilized to provide support to items of varying sizes, shapes or masses, so long as such items or their containers include one or more flat surfaces that may be safely rested upon flat surfaces of the shelf, or may be expected to remain on the shelf, so long as the shelf may properly accommodate each of the items' collective masses, volumes or surface areas. In some instances, a shelf may be releasably mounted to pegboards, panels or other structural features provided within a materials handling facility (e.g., within one or more inventory areas therein) in a releasable manner that enables the shelf to be quickly and easily removed from a structural feature and installed in different locations on the structural feature, or on one or more other structural features throughout the materials handling facility. Some structural features may be configured to accommodate shelves in any number of predetermined locations in three-dimensional space within a materials handling facility, with such locations being defined based on the sizes or dimensions of the respective items to be placed thereon. Furthermore, items that are placed on shelves in plain sight or fully or partially in view of users may be visually identified based on one or more markings placed thereon, or based on one or more temporary or permanent signs associated with such locations.

Today, the use of shelves or other like elements to temporarily store items in a materials handling facility has a number of drawbacks, however. For example, because any number of items may be provided on a common shelf, e.g., in a row or series, a user of a materials handling facility may not become aware that a level of inventory of a given item is depleted until the final item in the row or series is removed from the shelf. Additionally, determining a level of inventory or performing an accounting of the number or type of available items suspended from support bar may usually only be conducted by a visual inspection, e.g., by manually evaluating and counting each of the items stored on the shelf. While items are sometimes stored on a shelf in a homogenous manner, e.g., such that each of the items stored on the shelf is identical or fungible, the actual contents of a shelf may not be confirmed without performing a visual inspection, which may sometimes require lifting and relocating items on the shelf in order to view and evaluate other items stored thereon. While placing items on a shelf or removing items from the shelf are simple, identifying the items on the shelf or determining locations of such items on the shelf are far more complex.

BRIEF DESCRIPTION OF THE DRAWINGS

FIGS. 7A through 7C are views of components of one shelving system in accordance with implementations of the present disclosure.

DETAILED DESCRIPTION

As is set forth in greater detail below, the present disclosure is directed to systems and methods for tracking inventory in materials handling facilities or like environments based on weight. More specifically, the systems and methods of the present disclosure are directed to storage units or apparatuses such as shelves that may be installed into gondola units, perforated wallboards (e.g., pegboards), tracks or other support structures provided in inventory areas of a materials handling facility. Such storage units or apparatuses may be supported by, or associated with, one or more interposers, or devices installed between (e.g., interposed) such storage units or apparatuses and such pegboards, tracks or other structures. The interposers may include one or more load cells, e.g., in some embodiments, strain-gage load cells, that sense forces applied to the interposers by loads placed on such storage units or apparatuses, and determine masses of such loads, from which the loads may be identified, and locations of such loads on the storage units or apparatuses. The interposers may be compatible with both the storage units or apparatuses and the support structures, and may thus replace a traditional interface between a storage unit or apparatus and a support structure to which the storage unit or apparatus is traditionally mounted, thereby enabling implementations of the present disclosure to be incorporated into traditional storage units or apparatuses and structures quickly, inexpensively and effectively.

Figure 1A:
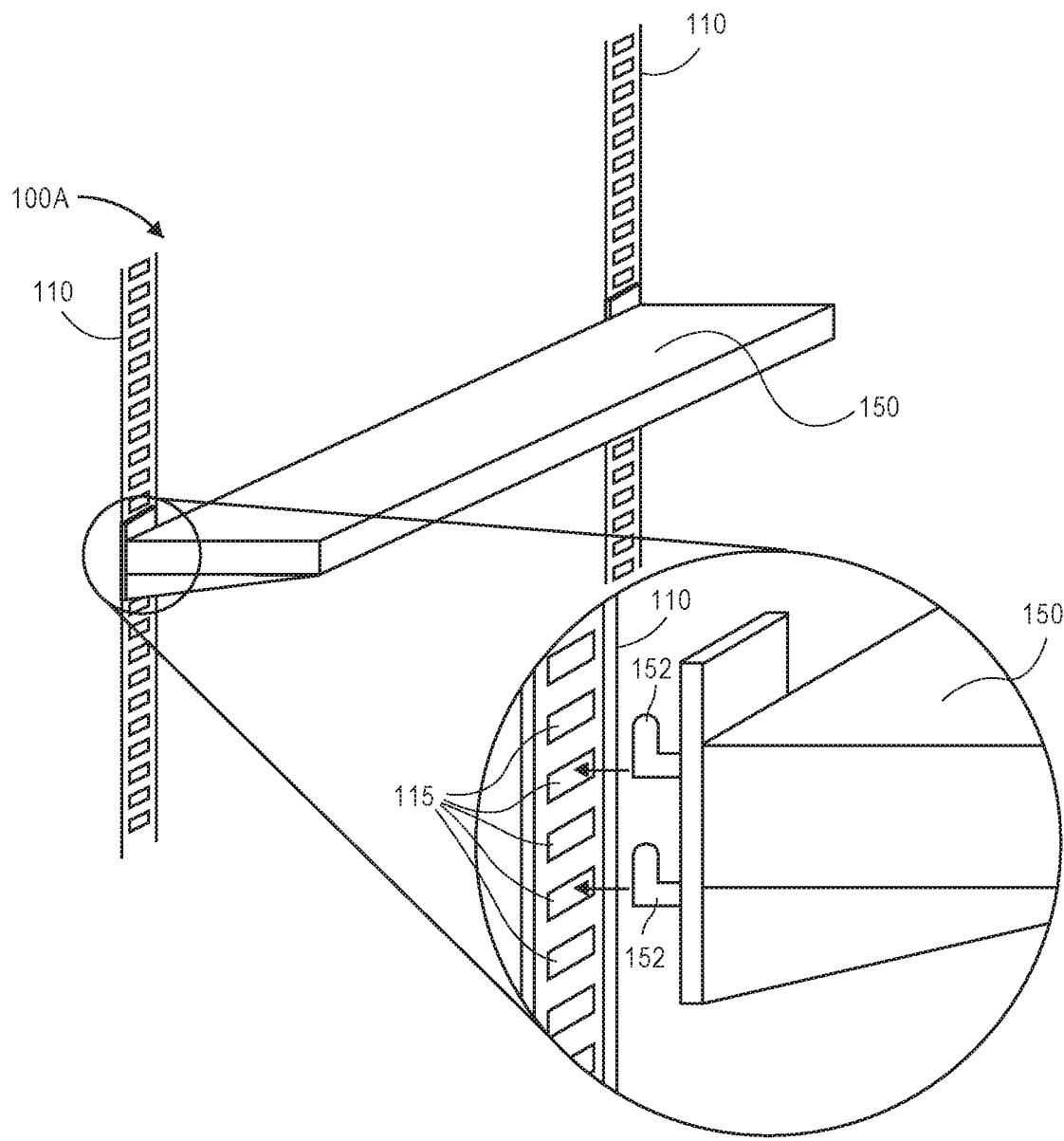
FIG. 1A is a view of one prior art shelving system.

The systems and methods of the present disclosure provide a number of advantages over prior art shelving systems. One such prior art shelving system 100A is shown in FIG. 1A. As is shown in FIG. 1A, the system 100A includes a pair of slotted supports 110 and a shelf 150. Each of the slotted supports 110 comprises a plurality of slots 115 that are vertically co-aligned and separated by a predetermined vertical distance. The slotted supports 110 may be mounted to all or a portion of a panel, a wall, a rack or another fixture or structural element within an inventory area or storage area at a materials handling facility, and may be formed from a vertical column of a substantially hard metal, wood, plastic or composite material having a regular pattern of slots for receiving one or more hooks or other protrusions therein, and for customizing the inventory area or storage area at a comparatively low cost. The shelf 150 includes pairs of hooks 152 at either end of the shelf 150, with each of the hooks 152 releasably inserted into one of the slots 115. The hooks 152 may be mounted to or component parts of one or more brackets or other portions of the shelf 150 that are configured to mount the shelf 150 to panels, walls, racks or other fixtures within the inventory or other storage area, and to enable the shelf 150 to receive one or more items thereon. Once the hooks 152 are installed into the supports 110, one or more objects may be placed onto a surface of the shelf 150 for short-term or long-term storage, subject to the capacities of the supports 110 and the shelf 150 in tension, compression, shear or other criteria.

In accordance with the present disclosure, the wall mounts 140 may be formed from any material of sufficient strength, rigidity or durability, including but not limited to plastics (e.g., thermosetting plastics such as epoxy or phenolic resins, polyurethanes or polyesters, as well as polyethylenes, polypropylenes or polyvinyl chlorides), wood (e.g., woods with sufficient strength properties such as ash), metals (e.g., lightweight metals such as aluminum, or metals of heavier weights including alloys of steel), composites or any other combinations of materials. Additionally, the shelf 150 may be formed from one or more planar sheets or panels of a substantially hard metal, wood, plastic or composite material.

Figure 1B:
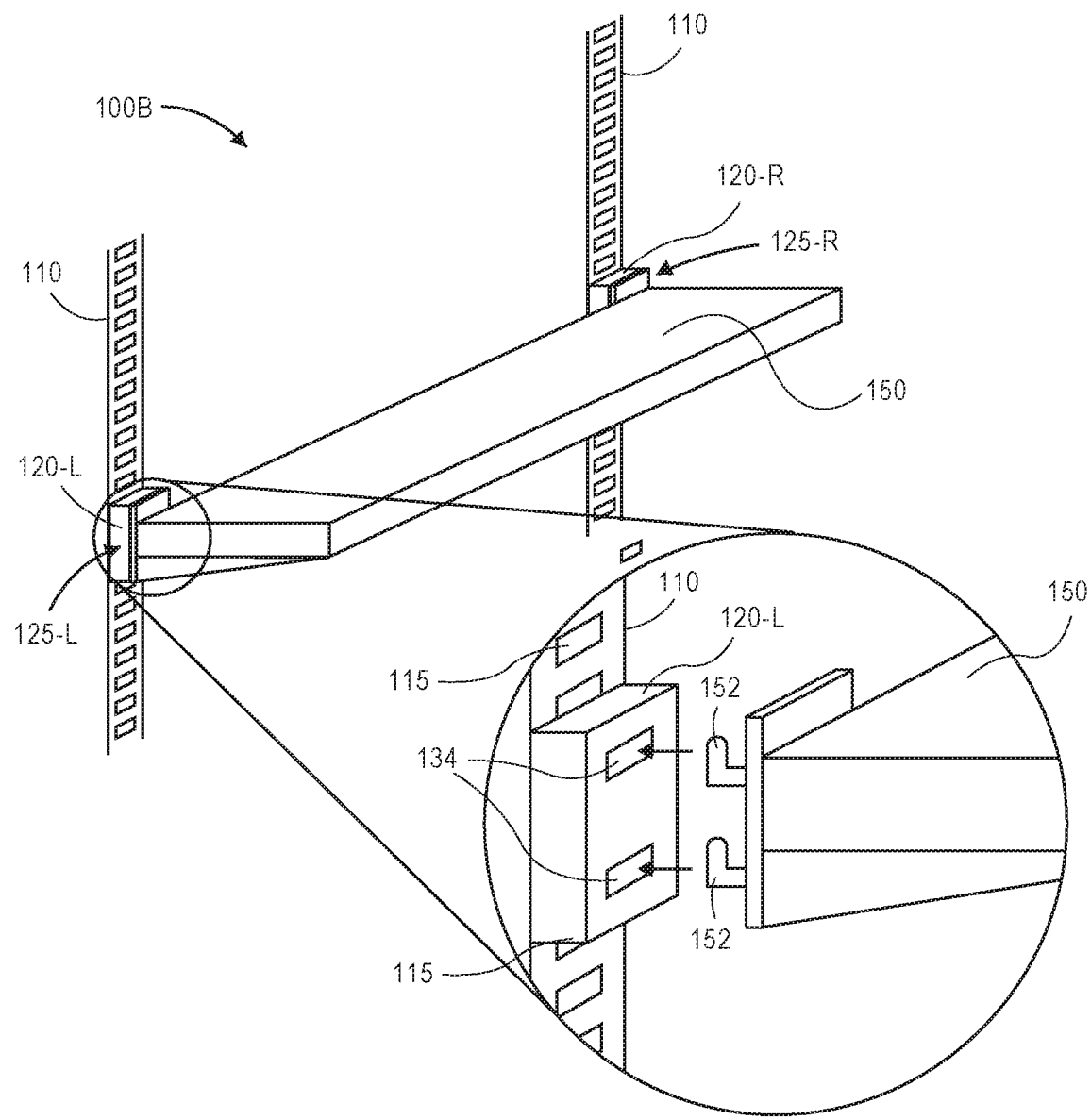
FIGS. 1B through 1D are views of components of one shelving system in accordance with implementations of the present disclosure.
Figure 1C:
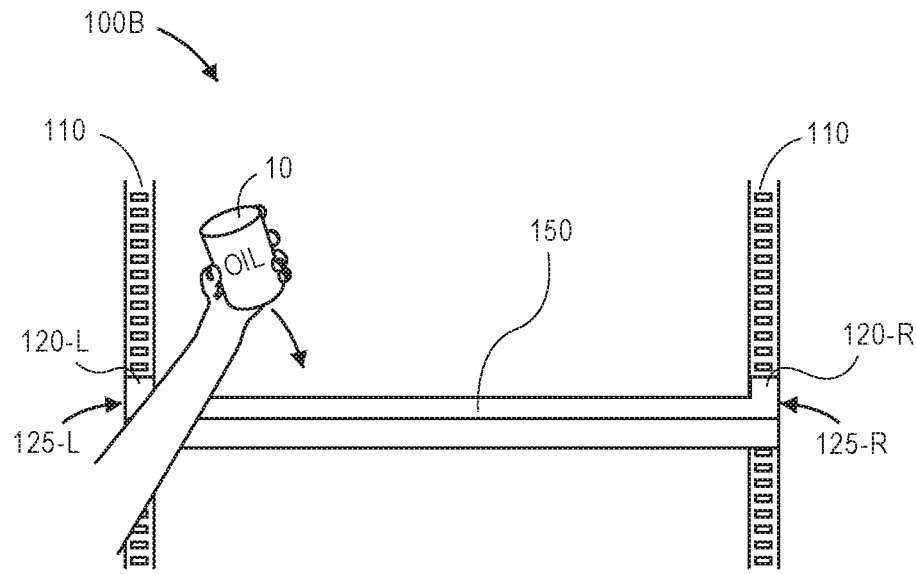
Figure 1D:
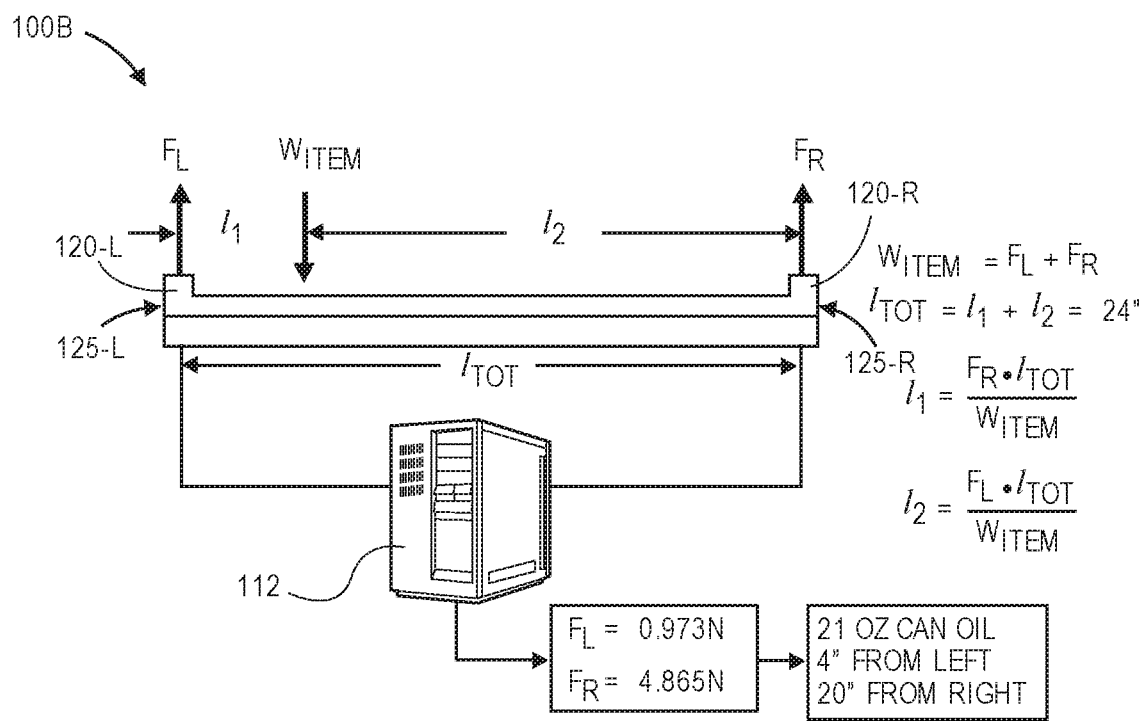

Referring to FIGS. 1B through 1D, components of one shelving system 100 in accordance with implementations of the present disclosure is shown. As is shown in FIG. 1B, the system 100B includes the pair of slotted supports 110 and the shelf 150 of the system 100A of FIG. 1A. As is further shown in FIGS. 1B through 1D, the system 100B further includes a pair of interposers 120-L, 120-R releasably installed on each of the supports 110. The interposers 120-L, 120-R may include a pair of hooks (not shown) and a pair of slots 134. The hooks on the interposers 120-L, 120-R are compatible with each of the hooks 152 of the shelf 150, and the slots 134 are compatible with each of the slots 115, such that the interposers 120-L, 120-R may be releasably inserted into the slots 115 in order to mount the interposers 120-L, 120-R thereon, and the hooks 152 may be releasably inserted into slots 134 provided in the interposers 120-L, 120-R in order to mount the shelf 150 thereon.

Each of the interposers 120-L, 120-R may include one or more load cells 125-L, 125-R disposed therein, e.g., within a chamber, an opening, a cavity or another volume, with such cells configured to sense deflections caused by loading on the shelf 150 when the interposers 120-L, 120-R are releasably installed in the supports 110, and when the shelf 150 is releasably installed in the interposers 120-L, 120-R. For example, the interposers 120-L, 120-R may feature cavities formed from plastic, rubber or other like materials, and may include the load cells 125-L, 125-R therein, e.g., strain-gage load cells, which, in some implementations, may include conductive elements such as aluminum, copper, silicon provided in strings or grids that are configured to sense changes in electrical resistance in response to physical loading. The load cells 125-L, 125-R are configured to generate load signals corresponding to loading on the shelf 150, and provide the load signals to one or more computing devices (not shown).

As is discussed above, in accordance with the present disclosure, the interposers 120-L, 120-R may be inserted between the supports 110 and the shelf 150, in a manner that replaces the traditional mounting interface between the supports 110 and the shelf 150 with one or more load cells 125-L, 125-R for sensing loads applied to the shelf 150. In particular, electrical load signals generated by the interposers 120-L, 120-R in response to loading or unloading may be used to determine a mass or weight of an object placed on the shelf 150, and, based on the mass, identify the object. Moreover, the electrical load signals may be further used to determine a location of the object on the shelf 150 based on the mass or weight of the object, and the distance between the load cells 125-L, 125-R.

Referring to FIG. 1C, an object 10 (e.g., a can of oil) is placed onto an upper surface of the shelf 150 at a location along a length of the shelf 150 between the interposers 120-L, 120-R. Referring to FIG. 1D, the shelf 150 is shown as a free body diagram in equilibrium and mounted to the interposers 120-L, 120-R, which are separated by a total length $l_{TOT}$ of twenty-four inches (24"). In accordance with the present disclosure, load signals corresponding to forces $F_L$, $F_R$ sensed by each of the load cells 125-L, 125-R within the interposers 120-L, 120-R are generated and returned to the server 112, which may use such signals to determine a weight of the item $w_{ITEM}$ according to standard equilibrium principles. For example, the weight of the weight of the item $w_{ITEM}$ may be determined as a sum of the forces $F_L$, $F_R$ sensed by the load cells 125-L, 125-R, or ($F_L+F_R$), less an accounting for the weight of the shelf 150, or any other items placed thereon (not shown).

As is shown in FIG. 1D, the forces $F_L$, $F_R$ each have values of 0.973 Newtons (N) and 4.865 Newtons (N), such that the sum of the forces $F_L$, $F_R$, or ($F_L+F_R$), is 5.838 Newtons (N). This sum corresponds to a gravitational force applied to a mass of 0.595 kilograms (kg), or a weight of twenty-one ounces (21 oz). In some implementations, the load signals generated by the load cells 125-L, 125-R may be analog signals that may be converted to digital signals prior to being transferred to the server 112. In other implementations, the load signals generated by the load cells 125-L, 125-R may be digital signals. The mass or weight of the item determined by the sum of the forces $F_L$, $F_R$, or ($F_L+F_R$), may be compared against an index, record or look-up table stored in a database or other data store in association with the server 112, and the item may be identified (viz., 21 oz. Can Soup) based on the mass of the item.

Additionally, where the total length $l_{TOT}$ between the load cells 125-L, 125-R is known, a location of the item on the shelf 150 may be determined based on a ratio of the forces $F_L$, $F_R$ to one another, with respect to the total length TOT. The location may be determined based on distances from the respective load cells 125-L, 125-R along a length of the shelf 150, such that the item may be presumed to lie on a line segment aligned transverse to the length of the shelf 150, between the interposers 120-L, 120-R. For example, as is shown in FIG. 1D, because the force $F_L$ sensed by the left load cell 125-L is five times greater than the force $F_R$ sensed by the right load cell 125-R, it is understood that a distance $l_1$ between the right load cell 125-R and the item 10 is five times greater than a distance $l_2$ between the left load cell 125-L and the item 10. Accordingly, in view of the total length $l_{TOT}$ of twenty-four inches (24") between the load cells 125-L, 125-R it may be determined that the item 10 is located along a line segment provided at a distance $l_1$ of four inches from the left load cell 125-L, or that distance $l_1=4"$, and that the item is located at a distance $l_2$ of twenty inches from the right load cell 125-R, or that distance $l_2=20"$.

Accordingly, using interposers including a plurality of load cells to replace interfaces between a shelf or other storage apparatus, and a support for the storage unit or apparatus, e.g., between the shelf 150 and the supports 110 shown in FIGS. 1A through 1C, masses or weights of items placed onto the shelf or other apparatus, or removed from the shelf or other apparatus, may be determined according to standard equilibrium principles, and the item may be identified based on the mass. Moreover, and also according to standard equilibrium principles, a location at which the item was placed onto the shelf or other apparatus, or a location from which the item was removed, may also be determined. The systems and methods of the present disclosure may be utilized to enhance the capacity of standard storage units or apparatuses, such as shelves and shelving systems, to provide an accurate and reliable accounting of the contents thereof. Moreover, although the system 100 of FIGS. 1B through 1D describes an identification of the item 10 and a location of the item after the item 10 is placed onto the shelf 150, those of ordinary skill in the pertinent art will recognize that the system 100B, and other systems and methods of the present disclosure, may be used to identify an item, such as the item 10, that is removed from the shelf 150, or a location from which the item was removed, based in changes in the values and sum of the forces $F_L$, $F_R$ sensed by each of the load cells 125-L, 125-R.

Shelves are widely used for storing items on a short-term or a long-term basis. Shelves are commonly found in residences (e.g., within living spaces or storage areas such as closets in homes or apartments or condominiums), commercial settings (e.g., warehouses, fulfillment centers or retail establishments) or industrial facilities (e.g., factories), and are particularly beneficial based on their simplicity of design and ease of access. Identifying the contents of a shelf, or determining when such contents change, are persistent challenges or limitations that impact their utility and value in many situations, however. As is noted above, the primary method for tracking inventory provided on a shelf has been by visual inspection. More recently, levels of inventory provided on shelves have been tracked using radiofrequency identification (or "RFID") technology, e.g., by equipping shelving units with RFID readers or sensors, and by incorporating RFID tags or emitters into items or their packaging. The use of RFID technology is effective but expensive, however, as each shelf must be provided with an RFID reader or sensor in close proximity, and each item to be stored on the shelf must be equipped with an RFID tag or emitter. Particularly for small items, or items that are deposited and retrieved at very high rates, RFID technology is sometimes deemed cost-ineffective for inventory tracking.

Additionally, items may also be identified by their respective weights. Using weight for inventory tracking is particularly reliable for inventory control and management, as weight is an immutable characteristic that does not readily change, and because identical or like items typically have identical or like weights. For example, a combination of three discrete items has the same net weight regardless of the order or configuration in which such items are stacked, laid or aligned on a shelf. Moreover, unlike a visual appearance, which may vary based on perspective or be easily confused, weights of items are typically both fixed and unique.

Items that are stored on a shelf, or changes in the number or type of such items, may be identified based on the weight of loads on the shelf, or based on the weights of items that are placed onto or removed from the shelf. In general, tracking items by their weight involves primary events such as removing an item from a shelf, placing the item onto a scale, determining a mass or weight of the item, and utilizing information regarding the mass or weight for one or more other purposes. For example, when purchasing pears that are sold by weight, a number of pears may be weighed on a scale, and a total mass or weight of the pears may be multiplied by a price-per-weight, in order to determine a total cost for the pears. Thus, contemporary methods for tracking items by weight within a materials handling facility commonly requires extensive or repeated interaction with the items by one or more users.

In order to measure weights of items that are stored on a shelf, the shelf must typically be augmented with one or more scales of any type or form, which may be physically and financially burdensome to install or operate effectively. For example, in order to use a shelf to measure a weight of an item placed thereon, a scale must be embedded within the shelf, or provided thereon, e.g., in a bin, a box or another container provided on the shelf such scales may include one or more weighing sensors for a weight of loads on the shelf, or determining changes in the weight of loads on the shelf. Where loads are placed onto or removed from locations corresponding to such sensors, a location of a load placed onto a shelf, or a location of a load removed from the shelf, may be generally determined based on locations of sensors for which changes in weight were sensed. Unless a shelf includes a plurality of scales having very small surface areas, however, determining a precise location of an item based on its weight is presently impossible.

The systems and methods of the present disclosure are directed to tracking an inventory of items stored on a traditional shelf, including not only identifying the items but also determining their locations on the shelf, based on their respective weights. More specifically, the systems and methods disclosed herein are directed to multiple load cells (or load sensors) that are compatible with traditional mounting interfaces between shelves and their structural supports, and are interposed between the shelves and their structural supports. An addition of an item to a shelf, or a removal of an item from the shelf, may be determined based on changes in net forces sensed by the load cells collectively, and by changes in the net forces sensed by each of the load cells individually. For example, the load cells of the present disclosure are configured to determine a total weight, a change in weight, and a position of a change in weight on an upper surface of a shelf. Such load cells may be inserted between a standard, unmodified shelf, and between a standard, unmodified support for the shelf, such as a cabinet, a gondola or gondola rack, or any like structure. An interposer including such load cells may be used to measure weights applied to the load cells by shelves, and items thereon.

Moreover, the interposer may provide a complete basis for connecting a shelf to a support, such that there is no connection, rubbing, touching, hanging or other contact or transfer or force between the shelf and the support except by way of the interposers. The interposers, or related components, may provide both a female opening or receptacle, and a male protrusion, extension or appurtenance, for making a connection between the shelf and the support. The male protrusion, extension or appurtenance of the interposers may be compatible with male protrusions, extensions or appurtenances provided on shelves or other storage units, and the female opening or receptacle may be compatible with female openings or receptacles provided on supports or other storage units. Thus, such interposers and/or their related components may replicate a connection between a shelf and a support while requiring no adjustments, modifications or renovations to either the shelf or the support.

In accordance with the present disclosure, where a shelf including one or more items thereon is supported in equilibrium by units that include the load cells, a total weight of the items is determined by a net total load sensed by the load cells (e.g., a total load sensed by such cells, less a weight of the shelf). Additionally, because the shelf is supported by the load cells in equilibrium, individual loads sensed by such cells may be used to determine a center of gravity of the loads. Thus, in accordance with the present disclosure, when each item is placed in a given location on a shelf, the weight and the center of gravity (which corresponds to the given location) of the item may be determined based on the individual loads sensed by each of the load cells. In some implementations, the location of an item on a shelf may be determined using a pair of interposers disposed at opposite ends of the shelf, and may thus be defined as a common line segment having a first distance from one of the interposers and a second distance from another of the interposers. In some other implementations, the location of an item may be determined using multiple pairs of interposers disposed at opposite ends of the shelf, and may thus be defined as an intersection of two or more of such line segments. Moreover, once the weight of the item is determined, the weight may be compared to an index, record or look-up table associating items with their respective weights, and used to identify the item that was placed at the location.

A load cell (sometimes called a "load sensor" or a "load transducer") is a transducer that converts a sensed mechanical force into a measurable electrical signal. The interposers of the present disclosure may incorporate any type or form of load cell. In some implementations, the load cells may be strain-gage load cells including a plurality of strain gages that are bonded onto a beam or structural member that deforms when weight is applied thereto. Strain gage load cells are commonly recognized for their accurate static and dynamic measurement capacities, and are typically designed with grids of wires or foils bonded to carrier matrices, with electrical resistance of such grids varying linearly with respect to strain applied to the grid. The extent of strain may be measured by determining a change in resistance when a force is applied to a carrier matrix, which is bonded to a surface. In some implementations, strain in a strain gage load cell may be measured using a Wheatstone Bridge or like circuit. The strain gages included in a load cell may be configured to sense both tension and compression in the beam or structural member, and may include multiple strain gages to improve their sensitivity to load and to compensate for temperature variations within a vicinity of the load cell. When a load cell is subjected to loads, the strain of the load cell causes the electrical resistance of the strain gages to vary in proportion to the loads.

In accordance with the present disclosure, the load cells that are used to determine a mass or a weight of an item placed on a shelf may be provided in a device (e.g., an interposer) installed between a shelf and a support therefor. The interposer may be compatible with both a support and a shelf, and configured to mate with the support in a manner that mimics a shelf, and to mate with the shelf in a manner that mimics a support. For example, the interposer and the support may have corresponding openings or receptacles, and the interposer and the shelf may have corresponding protrusions, extensions or appurtenances, with each of the openings or receptacles being compatible with each of the protrusions, extensions or appurtenances. The interposer thus replaces a traditional interface between a shelf and a support, and interposes therebetween sensors that may be used to determine forces to which the shelf is subjected based on dead loads (e.g., a weight of the shelf) and live loads (e.g., weights of items) provided thereon. Accordingly, the interposers may include features such as pegs, holes, hooks, slots or other like features that are configured to be mounted on a support in the same manner as a shelf, and to be mounted onto the shelf in the same manner as the support.

In some implementations, where a support includes a plurality of female openings or receptacles (e.g., holes or slots), and a shelf includes a plurality of male protrusions, extensions or appurtenances (e.g., pegs or hooks), an interposer having one or more load cells provided therein may be equipped with male protrusions, extensions or appurtenances corresponding to the female openings or receptacles of the support, and with female openings or receptacles corresponding to the male protrusions, extensions or appurtenances corresponding of the shelf. Alternatively, in other implementations, where a support includes a plurality of male protrusions, extensions or appurtenances, and where a shelf includes a plurality of female openings or receptacles, an interposer having one or more load cells provided therein may be equipped with female openings or receptacles corresponding to the male protrusions, extensions or appurtenances of the support, and with male protrusions, extensions or appurtenances corresponding to the female openings or receptacles corresponding to the female openings or receptacles of the shelf. In addition to pegs, hooks or other protrusions, or holes, slots or other receptacles, those of ordinary skill in the pertinent arts will recognize that an interposer having one or more load cells therein may be configured to mate with (e.g., between) shelves and supports with any other connecting features or implements. For example, the interposer may mimic a threaded, clamped, bolted or other connection between a shelf and a support by including one or more features or implements that may form both aspects of such a connection, e.g., features or implements that may mate with both the shelf and the support therebetween.

The systems and methods of the present disclosure may be incorporated into any number, type or size of shelving system having any number, type or size of shelves or other shelving units that are supported in any manner. For example, the interposers or like devices disclosed herein may be utilized in a gondola-type system, such as in support of a two-post shelf that is cantilevered from a back plane, or in support of a four-post shelf supported from either end, e.g., within a cabinet or like structure. Because the interposers of the present disclosure may be inserted between traditional shelves and traditional supports, the systems and methods disclosed herein may determine weights of items placed onto such shelves, or removed from such shelves, and enable such items to be identified or located based on such weights. In this regard, a traditional shelving system may be converted into a "smart" shelving system using interposers having one or more load cells provided therein, while still maintaining a look and feel of the traditional shelving system, and without requiring the installation of scales distributed throughout one or more shelving units.

A plurality of interposers having load cells incorporated therein may be utilized to determine a mass or a weight of an item placed on a shelf, and a location of the item, where the shelf is mounted in equilibrium by the interposers. Those of ordinary skill in the pertinent arts will recognize that an object in static equilibrium satisfies the following conditions. First, a vector sum of all external forces acting on the object must be zero. Second, a sum of torques due to all external forces acting on the object about any axis must also be zero. Accordingly, where a pair of interposers provide support to a shelf, a mass of an item disposed on the shelf may be identified by determining a sum of the forces sensed by each of the interposers, and a location of the item on the shelf may be determined based on a known distance between the pair of interposers. Where two or more pairs of interposers provide support to a shelf, a mass of an item disposed on the shelf may be identified by determining a sum of the forces sensed by each of the interposers, and a location of the item may be determined based on known distances between each of any pair of the interposers.

Those of ordinary skill in the pertinent art will further recognize that the term "weight" refers to a force applied to a given mass by acceleration due to gravity, or approximately 32 feet per second per second (32 ft/s$^2$), or 9.8 meters per second per second (9.8 m/s$^2$), which is substantially constant all over the planet Earth. Because weight is directly proportional to mass, the terms "weight" and "mass" may be used interchangeably throughout the present disclosure.

Figures 2A, 2B, 2C:
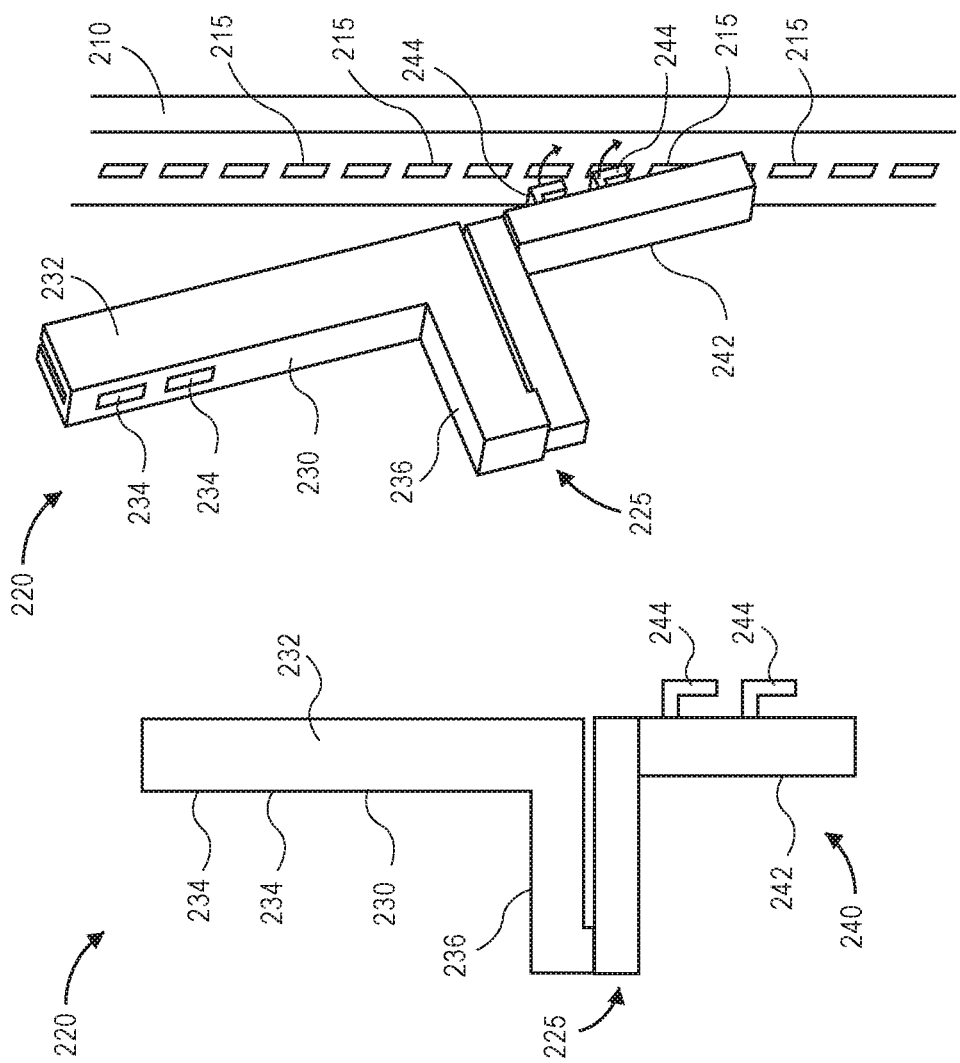
FIGS. 2A through 2C are views of components of one shelving system in accordance with implementations of the present disclosure.

As is discussed above, interposers may be provided in connections that mimic connections formed between shelves and supports. Referring to FIGS. 2A through 2C, views of components of shelving systems in accordance with implementations of the present disclosure are shown. Except where otherwise noted, reference numerals preceded by the number "2" shown in FIGS. 2A through 2C indicate components or features that are similar to components or features having reference numerals preceded by the number "1" shown in FIGS. 1A through 1D.

As is shown in FIGS. 2A and 2B, an interposer assembly 220 has a shelf connector 230, a support connector 240 and at least one load cell provided between the shelf connector 230 and the support connector 240. The shelf connector 230 comprises a vertical extension 232 and a cantilevered arm 236. The vertical extension 232 includes a plurality of slots 234 or other openings that are in vertical alignment on a front face of the vertical extension 232, and are adapted to receive one or more slots of a shelf (not shown) therein. The cantilevered arm 236 is provided to transfer forces from dead and live loads associated with the shelf (not shown), via the slots 234, to an outer or distal portion of the load cell 225.

The support connector 240 is provided beneath the load cell 225, and is configured to furnish structural support for the dead and live loads of the shelf (not shown). The support connector 240 includes a vertical extension 242 having a plurality of hooks 244 or other protrusions that are in vertical alignment on a rear face of the vertical extension 242, and are adapted for insertion into one or more slots or other openings of a support. As is shown in FIGS. 2A and 2B, the dimensions and configurations of the slots 234 on the shelf connector 230 correspond to the dimensions and configurations of the hooks 244 on the support connector 240, such that the hooks 244 are compatible with the slots 234, and that connections between a shelf (not shown) and the shelf connector 230, and between a support and the support connector 240, will mimic a connection between a shelf having hooks that correspond to hooks 244, and a support having slots that are compatible with the slots 234. The load cell 225 may thus be interposed between the shelf and the support, and may thus measure forces from the dead and live loads of the shelf that are transferred to the support. Using such forces, weights and locations of items on the shelf (e.g., items corresponding to the live loads) may be determined.

As is shown in FIG. 2C, the interposer 220 may be mounted to a support 210 having a plurality of slots 215 (e.g., provided in vertical alignment on a track), by inserting the hooks 244 of the support connector 240 into two of the slots 215, and pivoting the interposer 220, the shelf connector 230 and the support connector 240 until the vertical extension 232 and the vertical extension 242 are aligned in parallel to, and adjacent to, the support 210. When two or more of the interposers 220 are so mounted to the support 210 (e.g., in two or more slots 215 provided in two or more discrete tracks on the support 210), or to two or more supports 210, a shelf or other platform-like feature (not shown) may be mounted into the slots 234, and forces associated with items being placed onto the shelf, or removed from the shelf, may be transferred to the shelf connector 230 by way of the slots 234, and to the load cell 225 by way of the cantilever arm 236. Such forces may be determined based on load signals generated by the load cell 225 and used to not only identify such items but also determine the locations at which such items were placed or from which such items were removed.

Although the load cell 225, the shelf connector 230 and the support connector 240 of FIGS. 2A through 2C are shown as discrete, separate devices that are joined to one another, those of ordinary skill in the pertinent arts will recognize that load cells may be provided with one or more openings or receptacles, and with one or more protrusions, extensions or appurtenances, in any number or combination of discrete devices. In some embodiments, two or more of the load cell 225, the shelf connector 230 or the support connector 240 may be combined into a single, integral interposer assembly. For example, in some implementations, the load cell 225 and the shelf connector 230, or components thereof, may be combined into a single device for receiving hooks, pegs or other protrusions, extensions or appurtenances of a shelf or like elements, or otherwise mating with the shelf or like elements, and for measuring forces placed on the shelf or like elements. In some other implementations, the load cell 225 and the support connector 240, or components thereof, may be combined into a single device for insertion into holes, slots or other openings or receptacles of a support or like elements, or otherwise mating with the support or other like elements, and for measuring forces transferred to the support or other like elements. In still other implementations, the load cell 225, the shelf connector 230 and the support connector 240 may be provided in a single device that may replace an interface between a shelf or other like elements and a support or other like elements in its entirety.

Figure 3A:
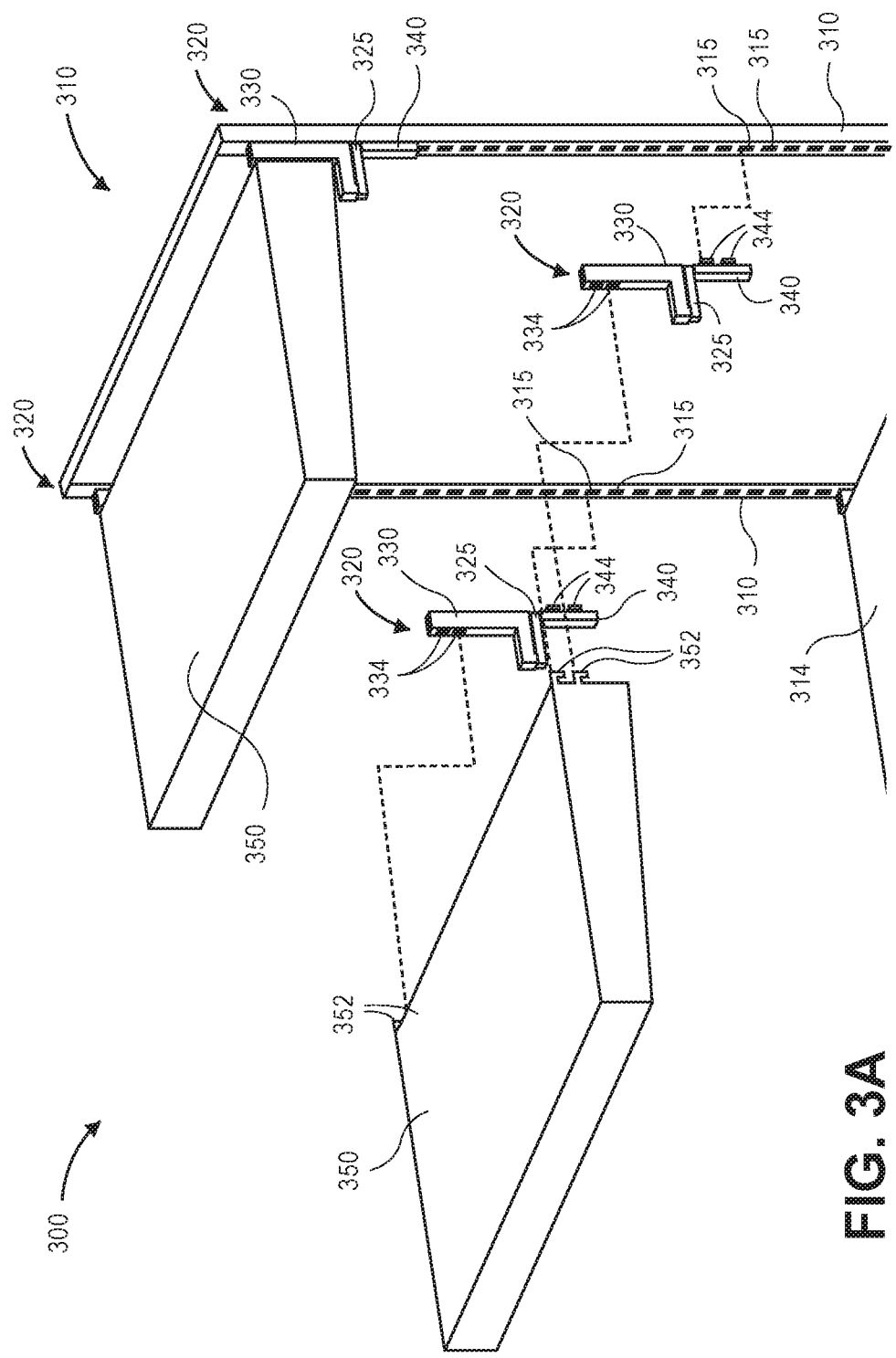
FIGS. 3A and 3B are views of components of one shelving system in accordance with implementations of the present disclosure.
Figure 3B:
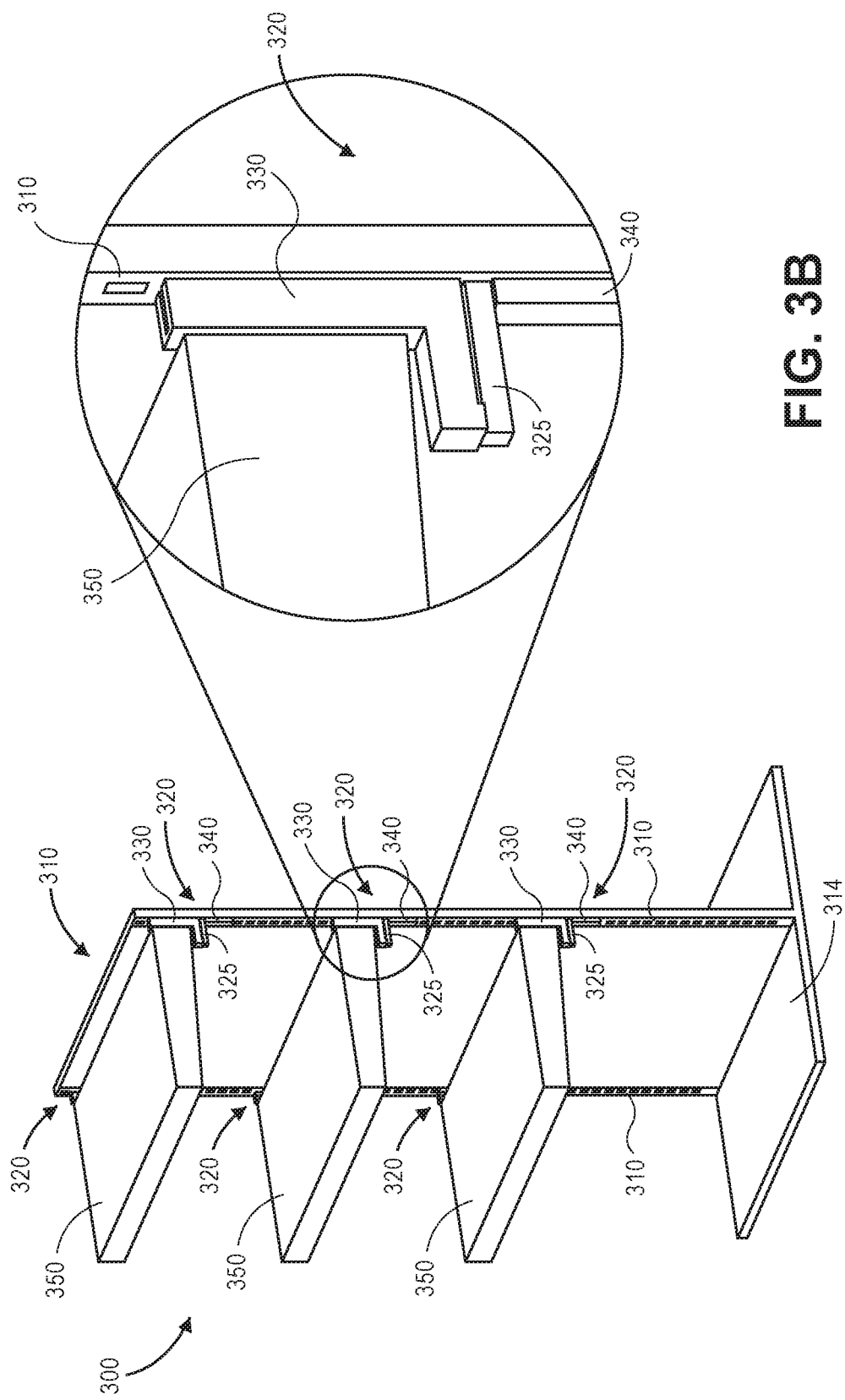

Referring to FIGS. 3A and 3B, views of components of one shelving system in accordance with implementations of the present disclosure are shown. Except where otherwise noted, reference numerals preceded by the number "3" shown in FIGS. 3A and 3B indicate components or features that are similar to components or features having reference numerals preceded by the number "2" shown in FIGS. 2A through 2C, or by the number "1" shown in FIGS. 1A through 1D.

As is shown in FIGS. 3A and 3B, a storage area 300 including a pair of supports 310 and a pair of shelves 350 is shown. The supports 310 are provided as tracks or track-like features on an upright 312 supported by a base 314. Each of the supports 310 includes a plurality of slots 315 in vertical alignment, with each of the slots 315 separated by a predetermined vertical distance, which may be determined based on a distance between edges of adjacent slots, or based on an on-center distance between centers of the adjacent slots. Each of the shelves 350 is mounted to the supports 310 by way of an interposer 320 having a load cell 325, a shelf connector 330 and a support connector 340. For example, as is shown in FIG. 3A, the shelf connector 330 may include one or more slots 334 or like female elements for receiving portions of shelves therein, e.g., one or more hooks 352 or like elements provided in association with the shelf 350 (e.g., on one or more brackets for supporting the shelf 350). The support connector 340 may include one or more hooks 344 or like male elements configured for insertion into the slots 315 on the supports 310. Each of the hooks 344 and the hooks 352 may be compatible with each of the slots 334 and the slots 315, such that connections between the shelf 350 and the interposer 320, or between the interposer 320 and the supports 310, mimic a connection between the shelf 350 and the supports 310.

In accordance with the present disclosure, loads placed on shelves may be transferred to supports by way of interposers, and forces acting on the interposers may be determined accordingly. As is shown in FIG. 3B, the load cells 325 may be aligned between the shelf connectors 330 and the support connectors 340, such that loads generated in response to the placement of items on a shelf 350 or the removal of items from the shelf 350 may be transferred first to the shelf connectors 330, then to the load cells 325, then to the support connectors 340, and finally to the supports 310. The load cells 325 may generate signals in response to such forces, and information regarding the forces may be used to determine a mass of one or more items placed on the shelf 350 or removed therefrom, to identify the items, and to determine locations at which the items were placed or a location from which the items were removed, using one or more computer devices (not shown).

As is further discussed above, masses of items placed onto a shelf or removed from a shelf, and locations at which such items were placed or from which such items were removed, may be determined by treating the shelf as a free body diagram and calculating values of masses of the items, and locations on the shelf where such items were placed or from which such items were removed, according to established equilibrium principles. Referring to FIGS. 4A through 4D, views of components of one shelving system 400 in accordance with implementations of the present disclosure are shown. Except where otherwise noted, reference numerals preceded by the number "4" shown in FIGS. 4A through 4D indicate components or features that are similar to components or features having reference numerals preceded by the number "3" shown in FIGS. 3A and 3B, by the number "2" shown in FIGS. 2A through 2C, or by the number "1" shown in FIGS. 1A through 1D.

Figure 4A:
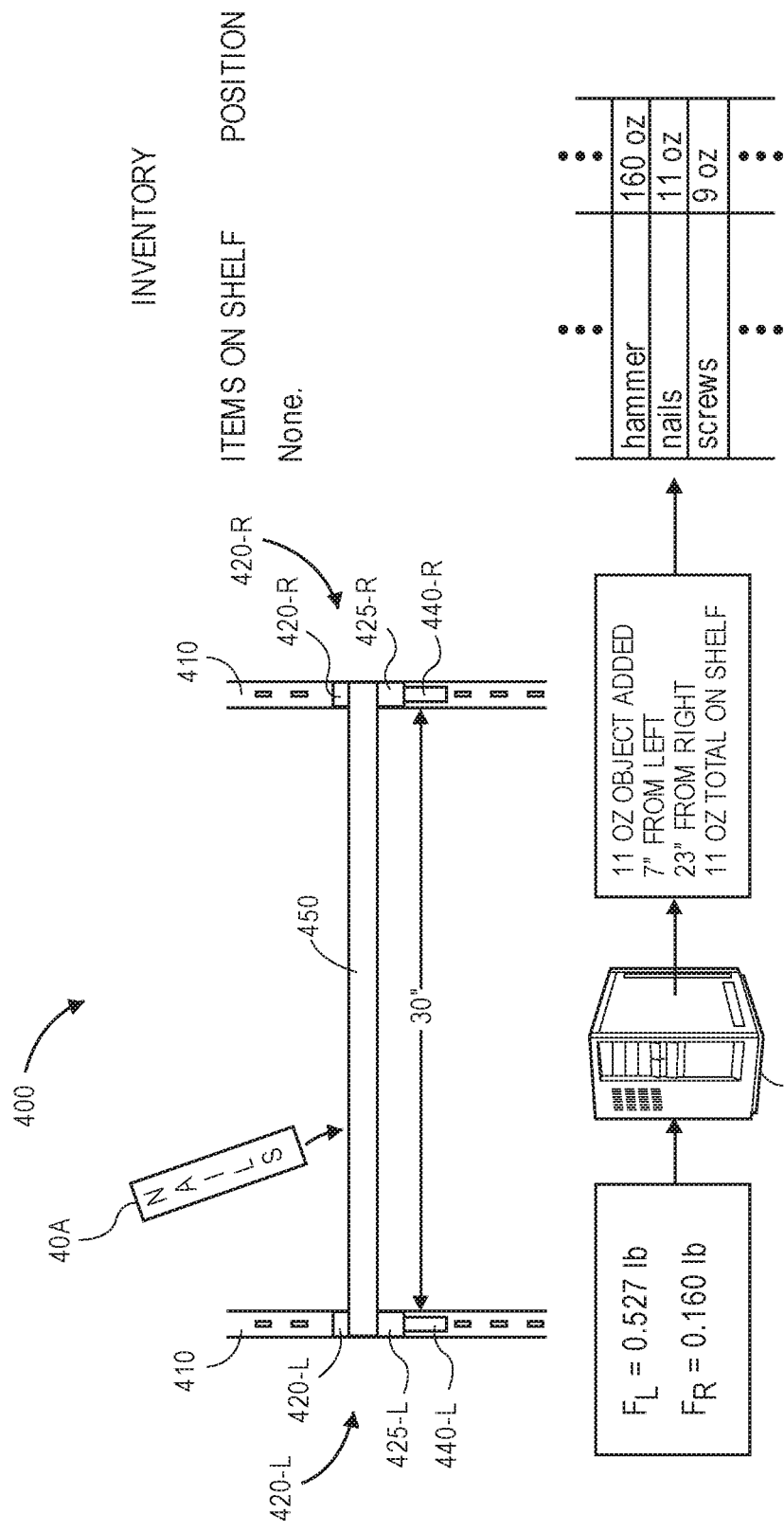
FIGS. 4A through 4D are views of components of one shelving system in accordance with implementations of the present disclosure.

As is shown in FIG. 4A, a shelving system 400 includes a pair of supports 410, a computer device 412 (e.g., a server) as well as a pair of interposers 420-L, 420-R for supporting a shelf 450. Each of the interposers 420-L, 420-R includes a load cell 425-L, 425-R, a shelf connector 430-L, 430-R and a support connector 440-L, 440-R, and is mounted between one of the supports 410 and the shelf 450, Each of the load cells 425-L, 425-R is in communication with the computer device 412, e.g., by wireless or wired means. The load cells 425-L, 424-R are configured to generate and transfer electrical signals corresponding to forces sensed from dead and live loads associated with the shelf 450, including a weight of the shelf 450 and weights of one or more items placed thereon. The interposers 420-L, 420-R are separated by a distance of thirty inches (30").

As is also shown in FIG. 4A, when an item 40A is placed onto the shelf 450, the load cells 425-L, 425-R may generate electrical signals corresponding to forces sensed thereby, and transfer such signals to the computer device 412. Based on such signals, values of forces $F_L$, $F_R$ sensed by the left and right load cells 425-L, 425-R, respectively, may be determined. The computer device 412 may interpret such signals and determine a mass of the item 40A based on a net sum of the forces $F_L$, $F_R$, or $(F_L+F_R)$. For example, upon placing the item 40A on the shelf, the left load cell 425-L sensed a force $F_L$ of 0.527 pounds (lb.), and the right load cell 425-R sensed a force $F_R$ of 0.160 pounds (lb.). Accordingly, a mass of the item 40A may be determined based on a sum of such forces, or $(F_L+F_R)$, viz., 0.687 pounds, or 11 ounces. The computer device 412 may further determine a location on the shelf 450 where the item 40A was placed based on the distance between the load cells 425-L, 425-R. For example, because the value of the force $F_L$ sensed by the left load cell 425-L is approximately two hundred twenty-nine (229%) greater than the value of the force $F_R$ sensed by the right load cell 425-R, the distance of the item 40A from the right interposer 420-R is approximately two hundred twenty-nine (229%) greater than the distance of the item 40A from the left interposer 420-L. Thus, as is shown in FIG. 4A, the item 40A is located approximately seven inches (7") from the left interposer 420-L, and approximately twenty-three inches (23") from the right interposer 430, on the thirty-inch (30") span of the shelf 450 between the interposers 420-L, 420-R.

Using the mass of the item 40A, the item 40A may be identified, e.g., by resort to an index, record or look-up table stored in a database or other data store in association with the computer device 412. Thus, for example, as is shown in FIG. 4A, the item 40A may be identified as a box of bread mix based on its eleven-ounce (11 oz.) weight. A record of the inventory on the shelf 450 may be updated to reflect the addition of the item 40A accordingly.

Figure 4B:
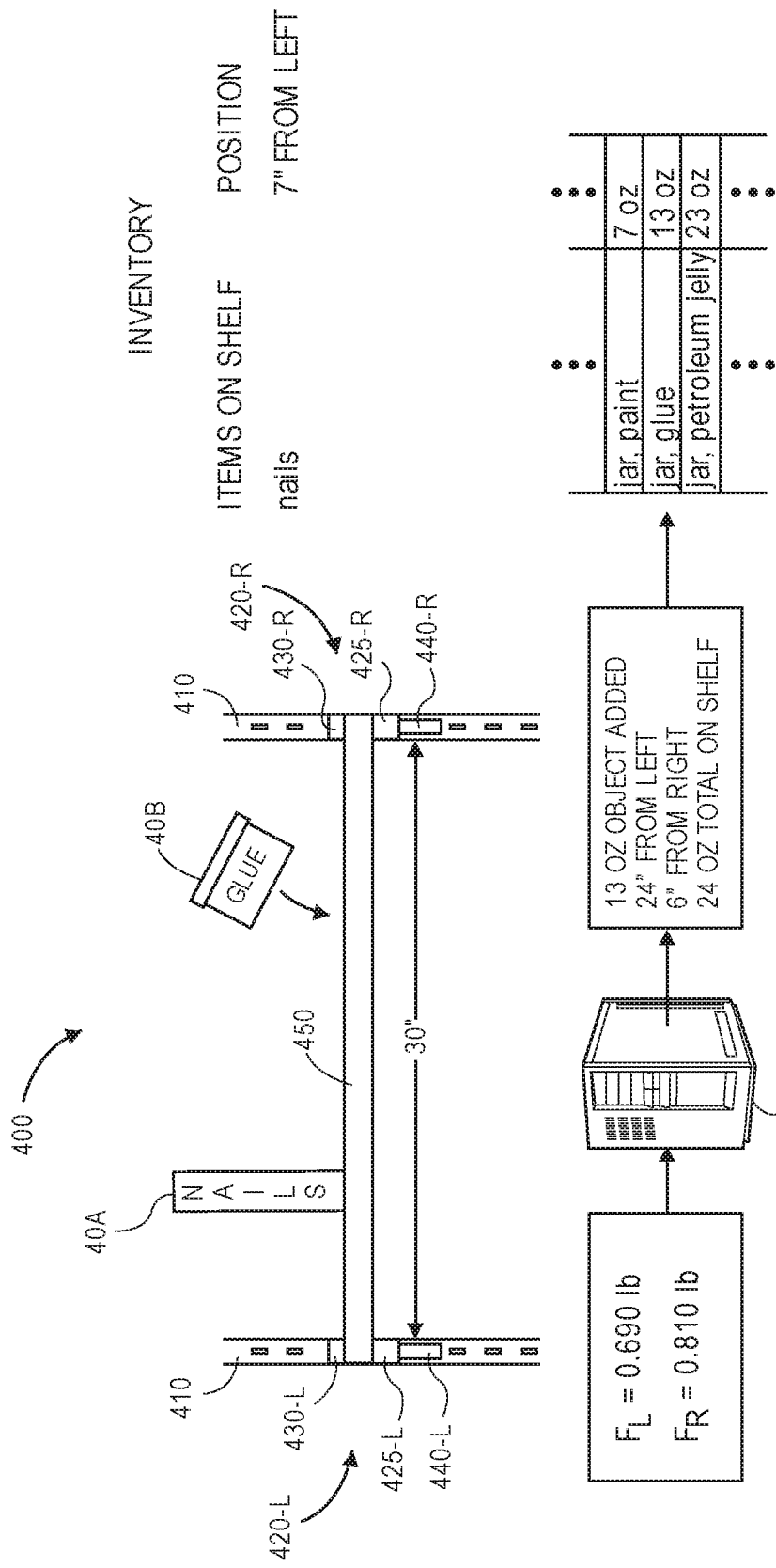

As is shown in FIG. 4B, when another item 40B is placed onto the shelf 450, the item 40B may be identified, and a location where the item 40B was placed, may be identified based on the corresponding forces sensed by the respective load cells 425-L, 425-R. For example, when the item 40B was placed onto the shelf 450, the left load cell 425-L sensed a force $F_L$ of 0.690 pounds (lb.), e.g., an increase of 0.163 pounds (lb.), and the right load cell 425-R sensed a force $F_R$ of 0.810 pounds (lb.), e.g., an increase of 0.650 pounds (lb.). Accordingly, amass of the item 40B may be determined by the computer device 412 based on a sum of such forces, or $(F_L+F_R)$, viz., 1.500 pounds, or twenty-four ounces (24 oz.), less the mass of the item 40A. The mass of the item 40B is thus determined to be thirteen ounces (13 oz.).

The computer device 412 may further determine a location on the shelf 450 where the item 40B was placed based on the distance between the interposers 420-L, 420-R. For example, because the addition of the item 40B to the shelf 450 increased the value of the force $F_L$ sensed by the left load cell 425-L by approximately 0.163 pounds (lb.), and increased the value of the force $F_R$ sensed by the right interposer 425-R by approximately 0.650 pounds (lb.), or approximately three hundred percent (300%) more than the increase in the value of the force $F_L$, the distance of the item 40B from the left interposer 420-L is approximately three hundred percent (300%), or three times, greater than the distance of the item 40B from the right interposer 420-R. Thus, as is shown in FIG. 4B, the item 40B is located approximately six inches (6") from the right interposer 420-R, and approximately twenty-four inches (24") from the left interposer 430, on the thirty-inch (30") span of the shelf 450 between the interposers 420-L, 420-R. Using the mass of the item 40B, the item 40B may be identified as a jar of mustard based on its thirteen-ounce (13 oz.) weight, and a record of the inventory on the shelf 450 may be updated to reflect the addition of the item 40B accordingly.

Figure 4C:
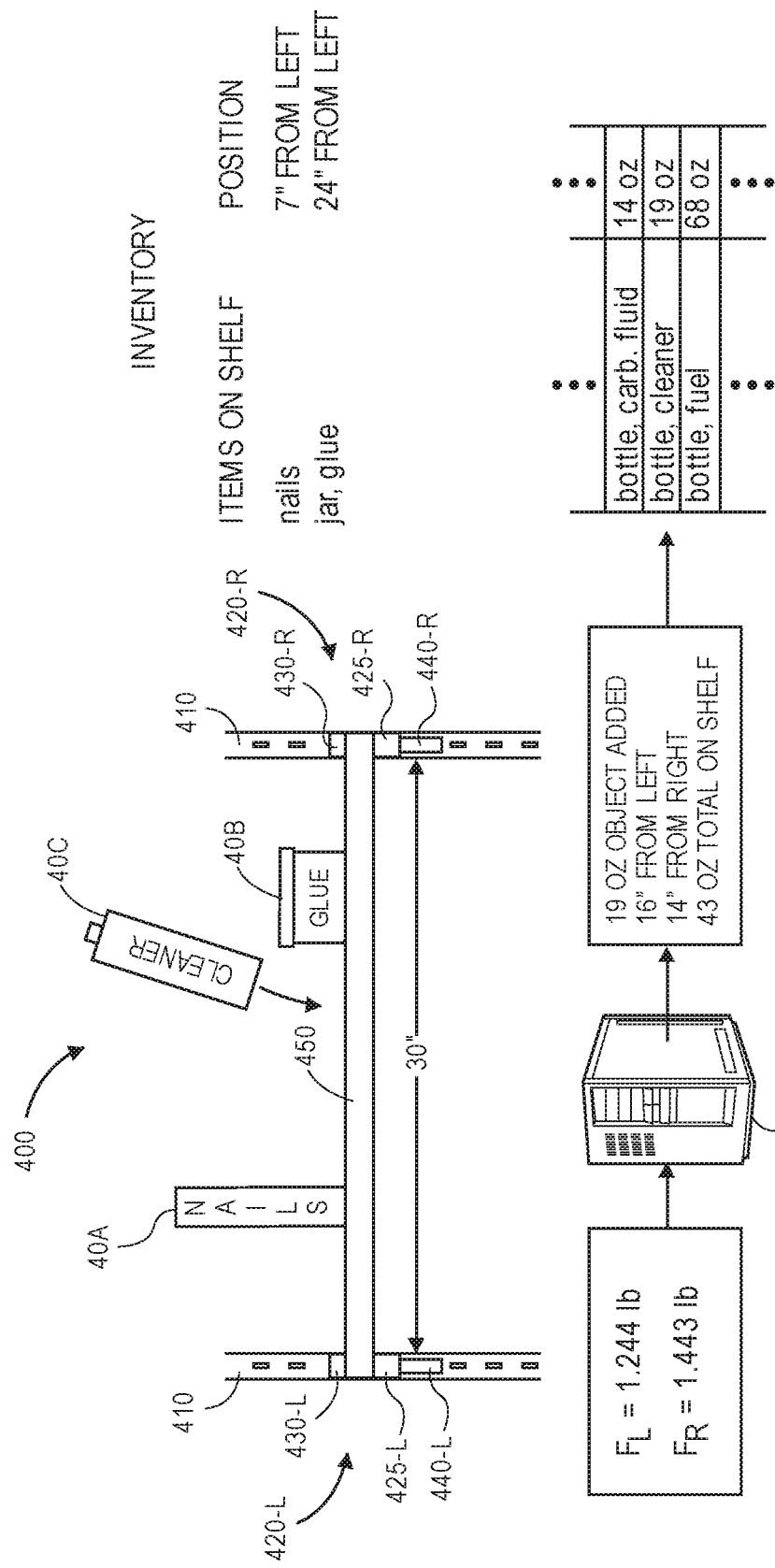

In a similar manner, as is shown in FIG. 4C, an item 40C added to the shelf 450 may be identified based on changes in the forces sensed by the load cells 425-L, 425-R. For example, where the addition of the item 40C to the shelf causes the forces $F_L$, $F_R$ to increase to 1.244 pounds (lb.) and 1.443 pounds (lb.), respectively, or by 0.554 pounds (lb.) and 0.633 pounds (lb.), respectively. A mass of the item 40C may be determined by the computer device 412 based on a sum of the changes in the forces, viz., 1.187 pounds (lb.), or nineteen ounces (19 oz.). Further, the computer device 412 may also determine that the item 40C is located sixteen inches (16") from the left interposer 420-L and fourteen inches (14") from the right interposer 420-R on the thirty-inch (30") span of the shelf 450 between the interposers 420-L, 420-R. Using the mass of the item 40C, the item 40C may be identified as a bottle of shampoo based on its nineteen-ounce (19 oz.) weight, and a record of the inventory on the shelf 450 may be updated to reflect the addition of the item 40C accordingly.

Figure 4D:
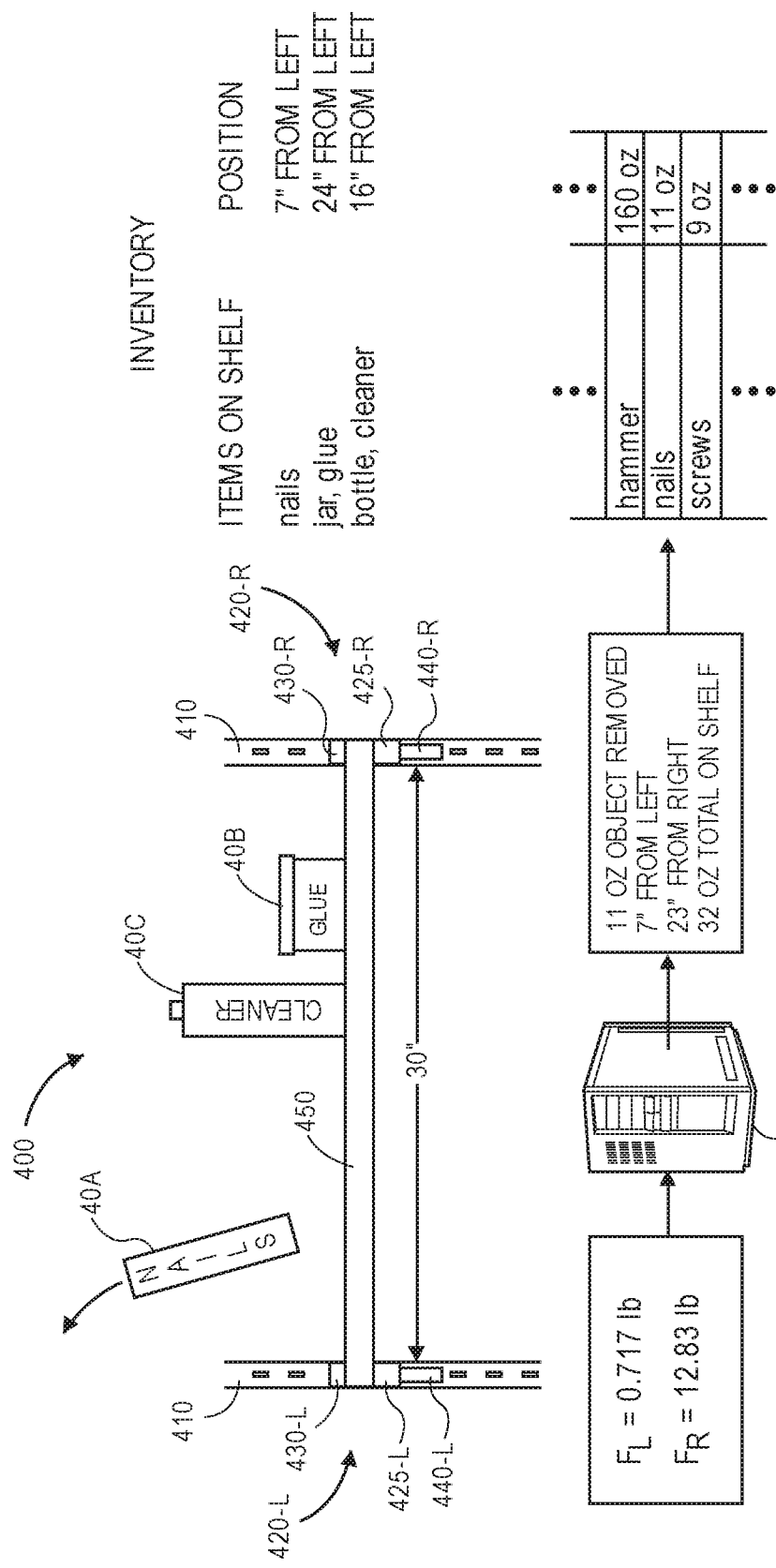

As is discussed above, the systems and methods of the present disclosure may be further utilized to identify an item removed from a shelf, and a location from which the item was removed, based on changes in forces sensed by two or more interposers. As is shown in FIG. 4D, when the item 40A is removed from the shelf 450, the forces $F_L$, $F_R$ sensed by the load cells 425-L, 425-R are reduced to 0.717 pounds (lb.) and 1.283 pounds (lb.), respectively, or by 0.527 pounds (lb.) and 0.160 pounds (lb.), respectively. The changes in the values of the forces $F_L$, $F_R$ sensed by the load cells 425-L, 425-R thus correspond to the weight of the item 40A, as is shown in FIG. 4A. In accordance with the present disclosure, that the item 40A was removed from the shelf 450 may be determined in the same manner that the items 40A, 40B, 40C were determined to have been added to the shelf 450, viz., by using the changes in force sensed by the load cells 425-L, 425-R following the removal to determine a mass and a location of the item that was removed. Alternatively, the differences in forces $F_L$, $F_R$ may be correlated directly with the item 40A by historical experience, e.g., because the absolute value of the changes in the forces observed following a removal of an item corresponds to the absolute value of the changes in forces observed following a prior addition of the item 40A, the item removed may be determined to be the item 40A. A record of the inventory on the shelf 450 may be updated to reflect the removal of the item 40C accordingly.

The identification of items added to or removed from a shelf or other storage unit may be further enhanced by defining regions or spaces such as lanes or blocks on the shelf or other storage unit that are dedicated for storage of identical or fungible items of the same or very similar masses. For example, where a shelf includes defined regions or spaces dedicated to the storage of screwdrivers weighing fourteen ounces (14 oz.) each, wrenches weighing sixteen ounces (16 oz.) each, and hammers weighing nineteen ounces (19 oz.) each, a change in mass of nineteen ounces, fourteen ounces or sixteen ounces on the shelf may be determined to correspond to a hammer, a screwdriver or a wrench, respectively, being added to or removed from a corresponding one of the regions or spaces. Conversely, a change in mass that is detected in a discrete region or space may be determined to correspond to additions or removals of items that are dedicated for storage in the discrete region or space. For example, where a shelf includes defined regions or spaces (e.g., bushels or boxes) for storing apples, carrots and mangoes, a change in mass sensed in one of the regions may be determined to correspond to the addition of a mass of items of a type corresponding to the one of the regions, or a removal of the mass of items of the type.

Figure 5:
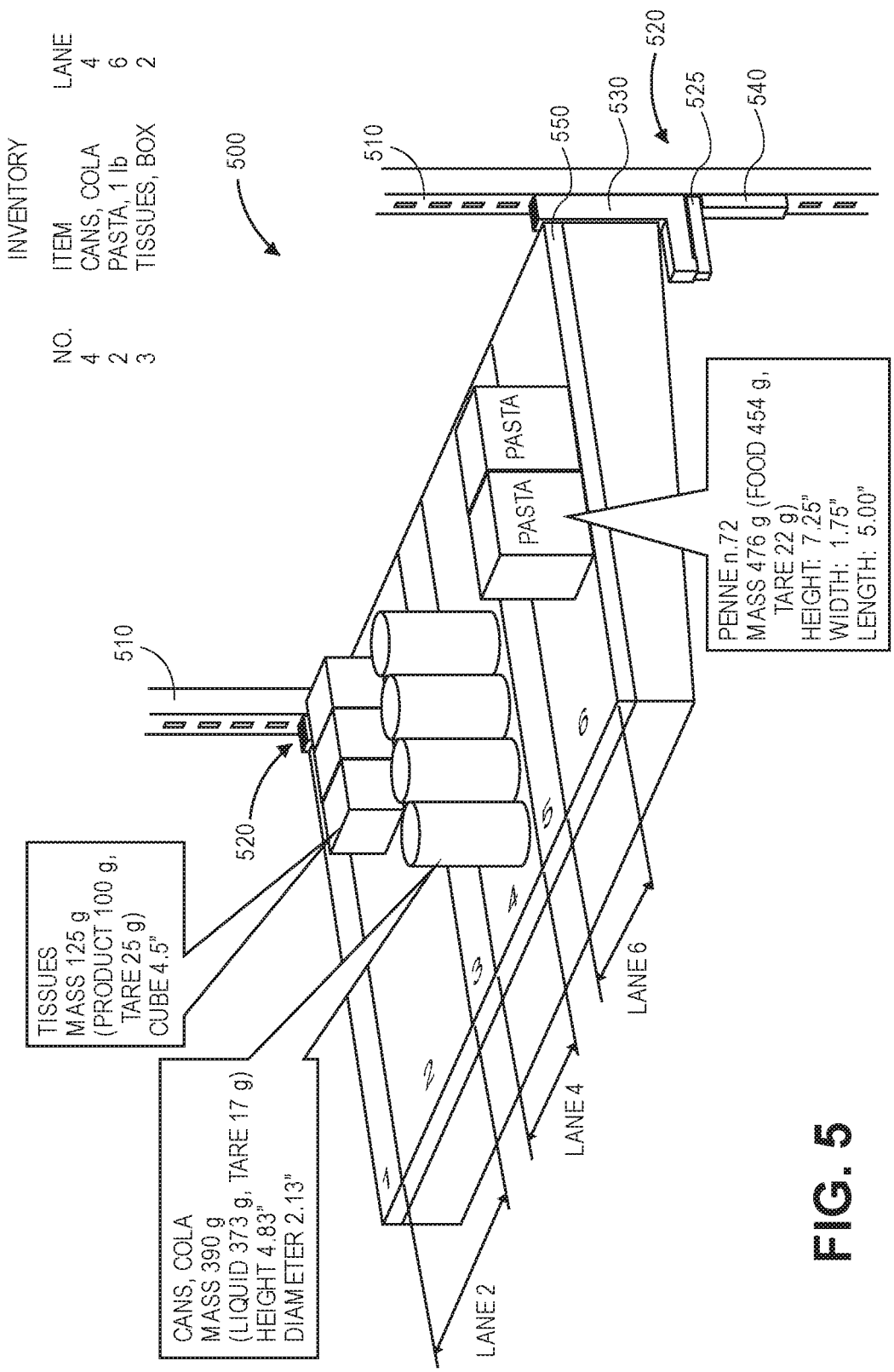
FIG. 5 is a view of one shelving system in accordance with implementations of the present disclosure.

Referring to FIG. 5, a view of one shelving system in accordance with implementations of the present disclosure is shown. Except where otherwise noted, reference numerals preceded by the number "5" shown in FIG. 5 indicate components or features that are similar to components or features having reference numerals preceded by the number "4" shown in FIGS. 4A through 4D, by the number "3" shown in FIGS. 3A and 3B, by the number "2" shown in FIGS. 2A through 2C, or by the number "1" shown in FIGS. 1A through 1D.

As is shown in FIG. 5, a shelving system 500 includes a shelf 550 joined to a pair of supports 510 by a pair of interposers 520, with each of the interposers 520 including a shelf connector 530, a support connector 540 and a load cell 525 disposed between the shelf connector 530 and the support connector 540. The supports 510 are track-like elements having a plurality of slots or openings provided therein. Additionally, the shelf connectors 530 are configured to mate with the shelf 550 in the same manner as the supports 510, e.g., with female slots or openings corresponding to the female slots or openings of the supports 510 (not shown) for mounting with male protrusions, extensions or appurtenances (not shown) provided on the shelf 550. Likewise, the support connectors 540 are configured to mate with the supports 510 in the same manner as the shelf 550, e.g., with male protrusions, extensions or appurtenances corresponding to the male protrusions, extensions or appurtenances provided on the shelf 550 (not shown) for mounting with the female slots or openings (not shown) provided in the supports 510.

In accordance with the present disclosure, the shelf 550 may include a plurality of defined regions or spaces for accommodating identical or fungible items thereon. Changes in force that are sensed within such regions or spaces may, therefore, be deemed to correspond with changes in mass of items associated with such regions or spaces. For example, as is shown in FIG. 5, the shelf 550 is demarcated with ten lanes, one of which (viz., lane 7) is dedicated for the storage of cans of cola having masses of three hundred ninety grams (390 g), heights of 4.83 inches (in.) and diameters of 2.13 inches (in.). Accordingly, additions of mass in three hundred ninety gram (390 g) increments may be deemed to correspond to cans of cola that are deposited in lane 7. For example, where an addition of a mass of 1.56 kilograms (kg) to the shelf 550 is detected, the mass may be determined to correspond to four cans of cola, and the four cans may be presumed to have been added to lane 7. Likewise, an addition of any mass in an area corresponding to lane 7 may be presumed to be one or more cans of cola.

The existence of predefined regions or spaces, e.g., lanes or blocks, on a shelf may be used as an exclusive tool for identifying an item deposited in such regions or spaces based on a change in force associated with such regions or spaces, or for determining a location at which an item was added to or removed from a shelf based on the change in force. Where a change in force caused by a placement or removal of an item having a known mass on a shelf is detected according to the present disclosure, the location at which the item was placed or from which the item was removed may be presumed to be a location with which items of the known mass are commonly associated. For example, referring again to FIG. 5, where a mass of four hundred seventy-six grams (476 g), is detected to have been placed onto or removed from the shelf 550, the item placed or removed may be assumed to be a box of pasta, and presumed to have occurred in lane 10, where boxes of pasta are stored. Similarly, where a change in force is determined to have occurred at a given location on a shelf with which specific items are commonly associated, the change in force may be understood to be associated with an addition of one or more of the specific items to the shelf, or a removal of one or more of the specific items from the shelf. For example, where a change in mass (e.g., an addition of an item, or a removal of an item) is detected in lane 3, the change in mass may be presumed to relate to an addition of a box of tissues, or a removal of a box of tissues, from lane 3.

The systems and methods of the present disclosure are not limited to shelves or shelving units supported at two points, e.g., the shelf 150 of the system 100 of FIGS. 1B through 1D, and that any number of interposers may be provided between storage units and supports therefor in accordance with the present disclosure. Likewise, such systems and methods are also not limited to identifying a line segment on which the items may be located, e.g., within one or more of the lanes of the shelf 550 shown in FIG. 5. In particular, some implementations of the present disclosure may include shelves or other storage units that are supported by two or more pairs of transducers, and a finite locate of a change in load may be sensed based on the loads sensed by each of the pairs of transducers.

Referring to FIGS. 6A through 6F, views of components of one shelving system in accordance with implementations of the present disclosure are shown. Except where otherwise noted, reference numerals preceded by the number "6" shown in FIGS. 6A through 6F indicate components or features that are similar to components or features having reference numerals preceded by the number "5" shown in FIG. 5, by the number "4" shown in FIGS. 4A through 4D, by the number "3" shown in FIGS. 3A and 3B, by the number "2" shown in FIGS. 2A through 2C, or by the number "1" shown in FIGS. 1A through 1D.

Figure 6A:
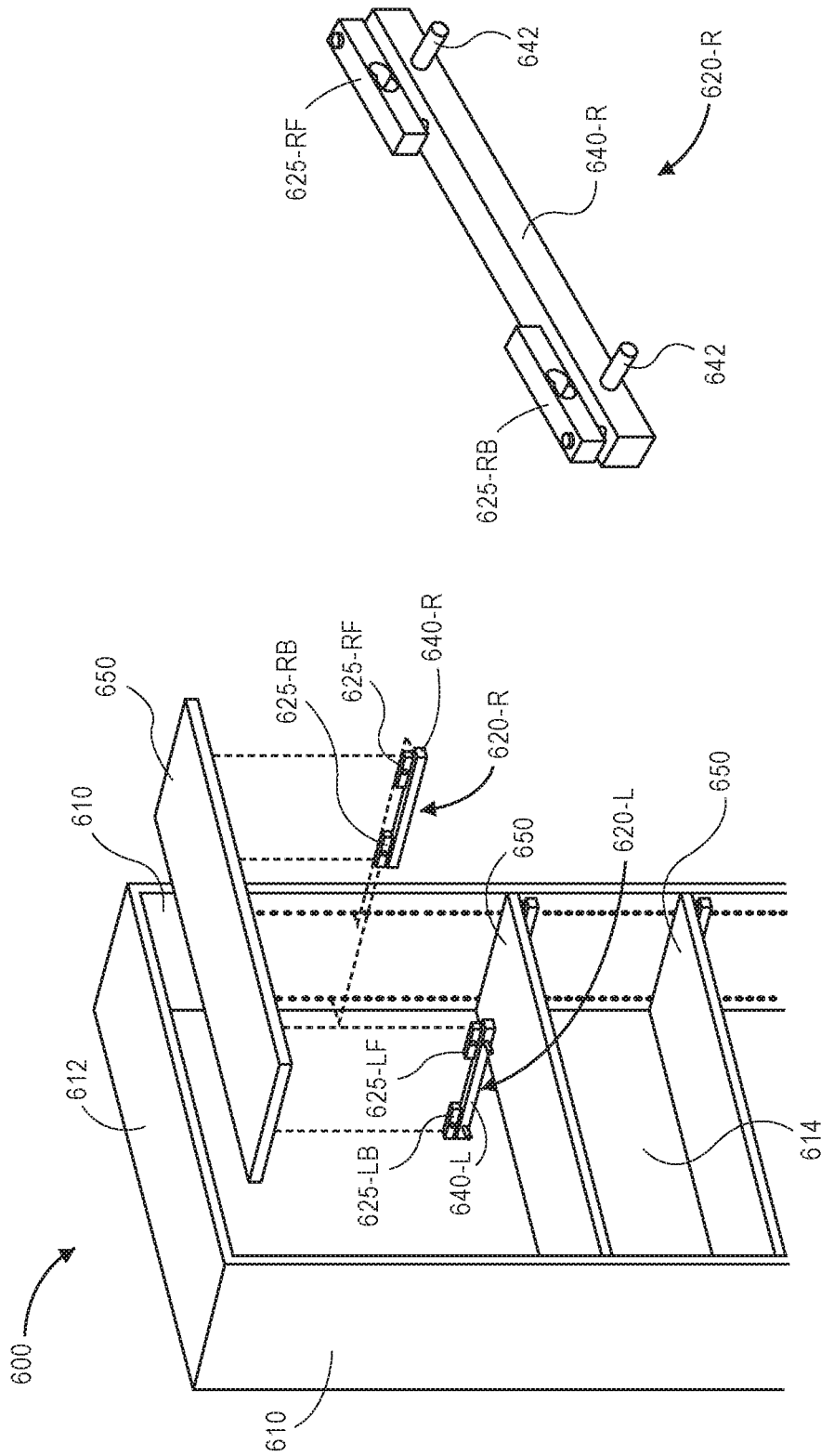
FIGS. 6A through 6F are views of components of one shelving system in accordance with implementations of the present disclosure.

As is shown in FIG. 6A, a shelving system 600 includes a pair of structural supports 610 a top panel 612, a back panel 614 and a plurality of shelves 650. The supports 610 may be vertical components of a traditional shelving system, e.g. internal faces of cabinets, bookcases or other like structural features. The shelves 650 may be traditional shelves configured for installation into such a traditional shelving system. For example, as is shown in FIG. 6A, each of the shelves 650 is mounted to the supports 610 by a pair of interposers 620-L, 620-R, each including a frame (e.g., the frame 640-R provided on the interposer 620-R) having protrusions 642 such as pegs that may be inserted into holes or other openings provided along interior surfaces of the supports 610. The interposer 620-L includes a pair of load cells 625-LB, 625-LF, provided near a back and a front of the shelving system 600, respectively. The interposer 620-R also includes a pair of load cells 625-RB, 620-RF, provided near a back and a front of the shelving system 600, respectively. The load cells 620-LB, 620-LB are positioned between the shelf 650 and the frame 640-L, and are aligned to sense forces associated with loads placed on the shelf 650. The interposers 620-RB, 620-RF are also positioned between the shelf 650 and the frame 640-R, and are also aligned to sense forces associated with loads placed on the shelf 650.

Figure 6B:
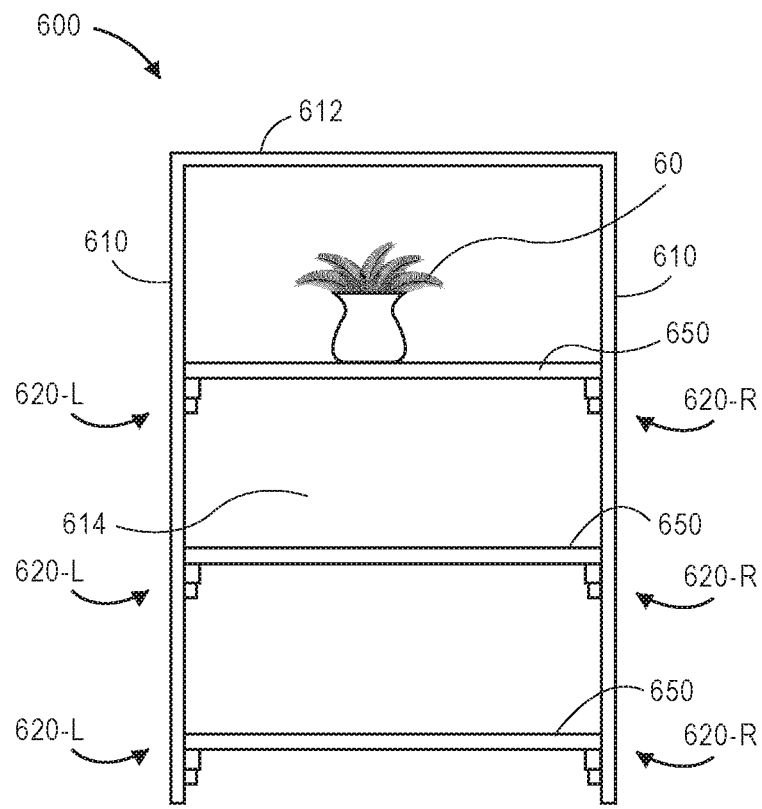
Figure 6C:
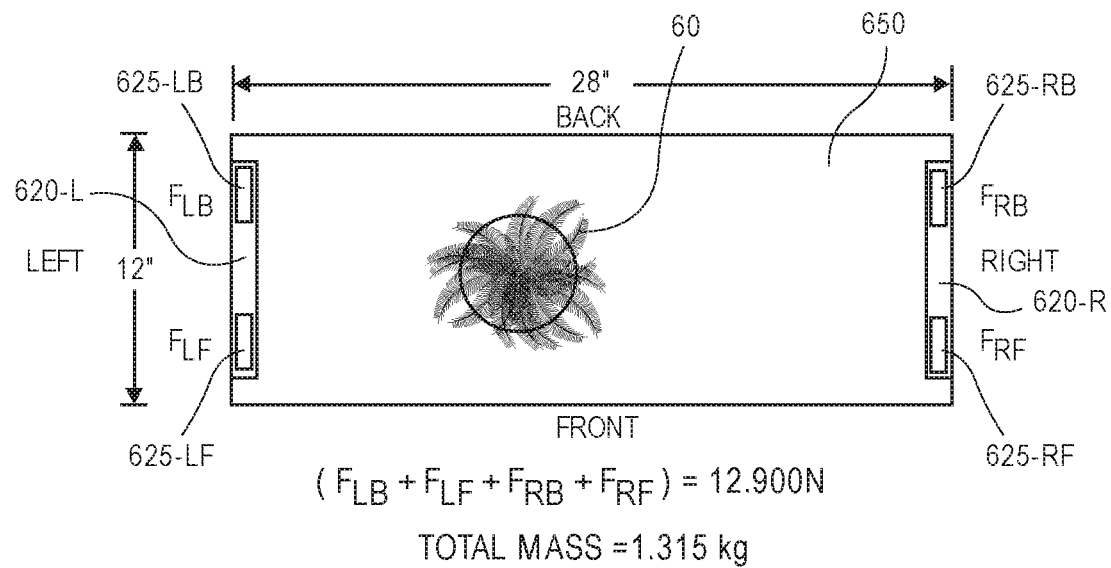

In accordance with the present disclosure, two or more discrete pairs of interposers having load cells provided therein may be used to both identify an item placed on a shelf or other storage unit, and determine a precise location of the item. Referring to FIGS. 6B and 6C, an item 60 is placed on one of the shelves 650, and loads associated with the placement of the item 60 are sensed by the interposers 620-LB, 620-LF, 620-RB, 620-RF. The shelf 650 has a width of twenty-eight inches (28") and a depth of twelve inches (12").

As is discussed above, the item 60 may be identified based on a mass determined from a sum of the forces sensed by the interposers 620-LB, 620-LF, 620-RB, 620-RF. As is shown in FIG. 6C, the sum of the forces is 12.900 Newtons (N), corresponding to a mass of 1.315 kilograms (kg). Thus, using mass of the item 60, the item 60 may be identified, viz., as a flowerpot, by resort to an index, record or look-up table associating items with their respective weights. The index, the record or the look-up table may be stored in a database or other data store (not shown).

Figure 6D:
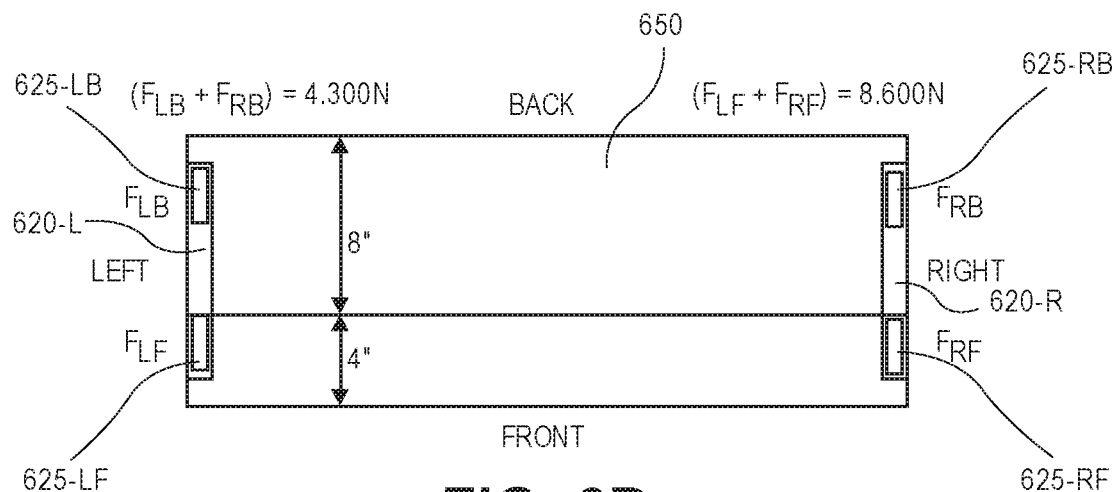

As is also discussed above, a location of the item 60 on the shelf 650 may be determined based on the individual forces sensed by each of the interposers 620-LB, 620-LF, 620-RB, 620-RF. For example, as is shown in FIG. 6D, a sum of the forces sensed by the interposers 620-LB, 620-RB, which are located near a back edge of the shelf 650, is 4.300 Newtons (N), while a sum of the forces sensed by the interposers 620-LF, 620-RF, which are located near a front edge of the shelf 650, is 8.600 Newtons (N). Thus, based on the respective sums, the item 60 may be determined to be located along a line segment extending parallel to the back edge of the shelf 650 and to the front edge of the shelf 650, eight inches (8") from the back edge of the shelf 650, and four inches (4") from the front edge of the shelf 650, according to standard equilibrium principles.

Figure 6E:
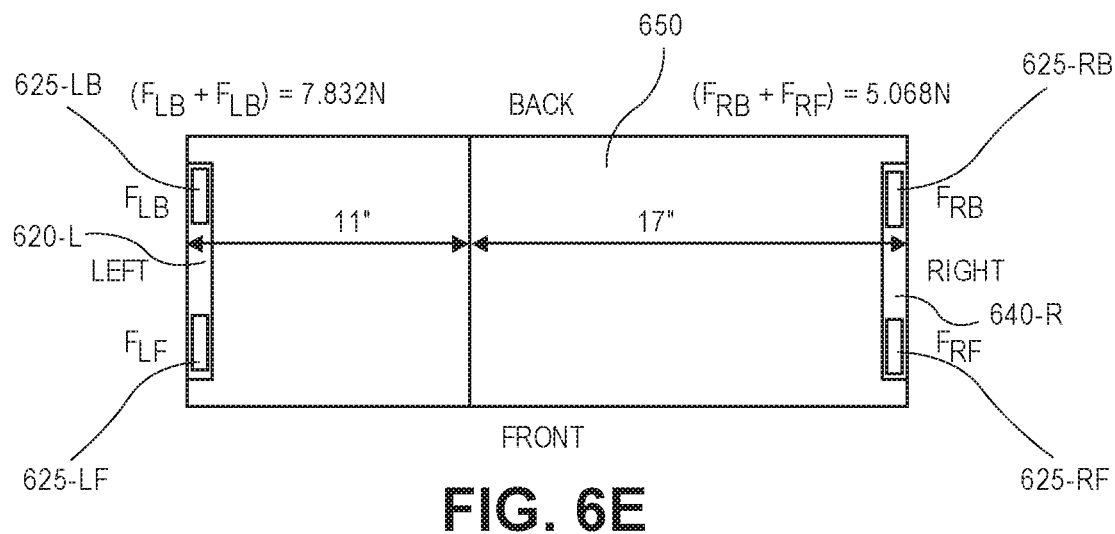
Figure 6F:
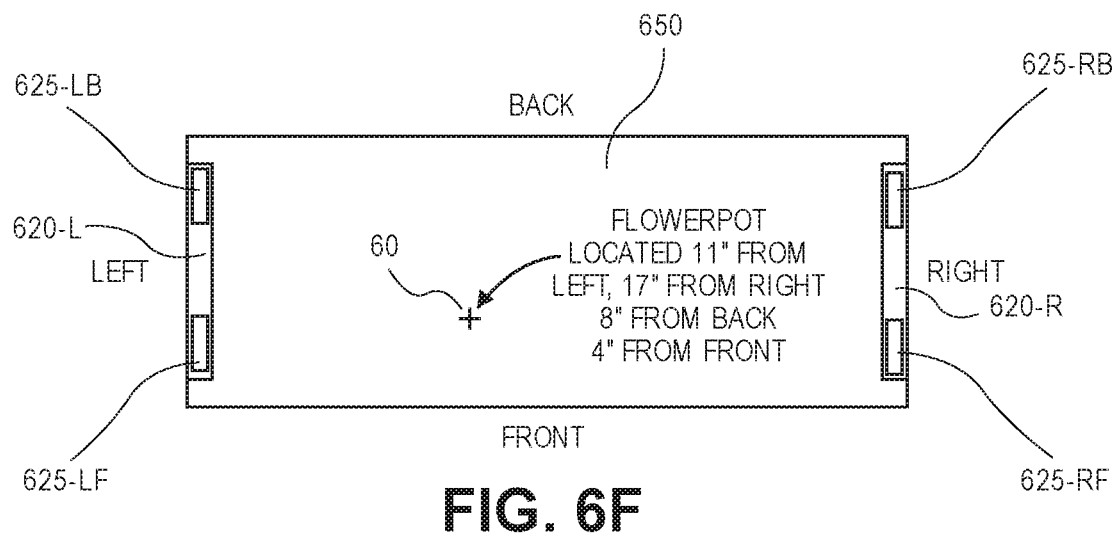

Likewise, as is shown in FIG. 6E, a sum of the forces sensed by the interposers 620-LB, 620-LF, which are located near a left edge of the shelf 650, is 7.832 Newtons (N), and a sum of the forces sensed by the interposers 620-RB, 620-RF, which are located near a right edge of the shelf 650, is 5.068 Newtons (N). Thus, based on the respective sums, the item 60 may be determined to be located along a line segment extending parallel to the left edge of the shelf 650 and to the right edge of the shelf 650, eleven inches (11") from the left edge of the shelf 650, and seventeen inches (17") from the right edge of the shelf 650, according to standard equilibrium principles.

As is discussed above, a location of the item 60 may be determined based on an intersection of the line segment extending parallel to the back and front edge of the shelf 650, and an intersection of the line segment extending parallel to the left and right edges of the shelf 650. Thus, based on the forces sensed by each of the interposers 620-LB, 620-LF, 620-RB, 620-RF, the item 60 may be determined to be approximately located at a point that is eight inches (8″) from the back edge of the shelf 650, four inches (4″) from the front edge of the shelf 650, eleven inches (11″) from the left edge of the shelf 650, and seventeen inches (17″) from the right edge of the shelf 650.

Those of ordinary skill in the pertinent arts will recognize that the interposers and/or load cells provided therein may take any shape or form. Referring to FIGS. 7A through 7C, views of components of one shelving system in accordance with implementations of the present disclosure are shown. Except where otherwise noted, reference numerals preceded by the number "7" shown in FIGS. 7A through 7C indicate components or features that are similar to components or features having reference numerals preceded by the number "6" shown in FIGS. 6A through 6F, by the number "5" shown in FIG. 5, by the number "4" shown in FIGS. 4A through 4D, by the number "3" shown in FIGS. 3A and 3B, by the number "2" shown in FIGS. 2A through 2C, or by the number "1" shown in FIGS. 1A through 1D.

As is shown in FIG. 7A, an interposer assembly 720A includes a load cell 725A, a shelf mounting section 730A and a support mounting section 740A in a single integral construction. The load cell 725A is an S-shaped or S-beam strain-gage load cell positioned between the shelf mounting section 730A and the support mounting section 740A. The shelf mounting section 730A includes a plurality of slots 734A for receiving hooks or other extensions of a shelf (not shown) therein. The support mounting section 740A includes a plurality of hooks 744A for insertion into corresponding slots of a support (not shown). The hooks 744A are compatible with the slots 734A, such that a connection between a shelf and the shelf mounting section 730A, and a connection between the support mounting section 740A and a support, may mimic a connection between the shelf and a support.

As is shown in FIG. 7A, the shelf mounting section 730A is positioned vertically above the load cell 725A, and the support mounting section 740A is positioned vertically below the load cell 725A. Accordingly, the interposer assembly 720A of FIG. 7A may be inserted between a shelf and a support (not shown), and used to sense loads that are applied to the shelf and transferred to the support. Electrical load signals corresponding to such loads may be used to determine masses of the loads, to identify the loads, and to determine locations of such loads on the shelf.

Likewise, as is shown in FIG. 7B, an interposer assembly 720B includes a load cell 725B, a shelf mounting section 730B and a support mounting section 740B in a single integral construction. The load cell 725B is an S-shaped or S-beam strain-gage load cell positioned between the shelf mounting section 730B and the support mounting section 740B. The shelf mounting section 730B includes a plurality of slots 734B for receiving hooks or other extensions of a shelf (not shown) therein. The support mounting section 740B includes a plurality of hooks 744B for insertion into corresponding slots of a support (not shown). As is shown in FIG. 7B, the shelf mounting section 730B is horizontally forward of the load cell 725B, and the support mounting section 740B is positioned horizontally aft of the load cell 725B. The hooks 744B are compatible with the slots 734B, such that a connection between a shelf and the shelf mounting section 730B, and a connection between the support mounting section 740B and a support, may mimic a connection between the shelf and a support. Accordingly, the interposer assembly 720B of FIG. 7B may be inserted between a shelf and a support (not shown), and used to sense loads that are applied to the shelf and transferred to the support. Electrical signals corresponding to such loads may be used to determine masses of the loads, to identify the loads, and to determine locations of such loads on the shelf.

As is shown in FIG. 7C, an interposer assembly 720C includes a load cell 725C suspended from a support mounting section 740C. The load cell 725C has a flat surface 734C upon which a shelf or other platform-like section may rest when the support mounting section 740C is installed in a support (not shown), e.g., by inserting a peg 744C into a corresponding hole of the support. The load cell 725C may be configured to sense loads applied to the shelf, which are transferred from the shelf to the interposer assembly 720C by the flat surface 734C, and then to the support by the peg 744C. The interposer assembly 720C may thus be used in shelving systems in which shelves are supported by pegs, pins or other components inserted into holes provided therein, and may be used in place of one or more of such pegs, pins or other components in similar applications.

An interposer assembly such as the interposer assemblies 720A, 720B, 720C of FIGS. 7A, 7B and 7C may be installed in any two-post or four-post systems, and may replace traditional shelf pins, shelf pegs, shelf fittings, brackets or other features. Additionally, although the interposer assemblies 720A, 720B of FIGS. 7A and 7B feature slots and hooks for mating with shelves and supports, and the interposer assembly 720C of FIG. 7C features a peg for insertion into a support and a substantially flat surface for resting a shelf thereon, those of ordinary skill in the pertinent arts will recognize that the manner in which interposers assemblies of the present disclosure may mate with shelves or supports is not limited by any of the embodiments shown or described herein.

Figure 8:
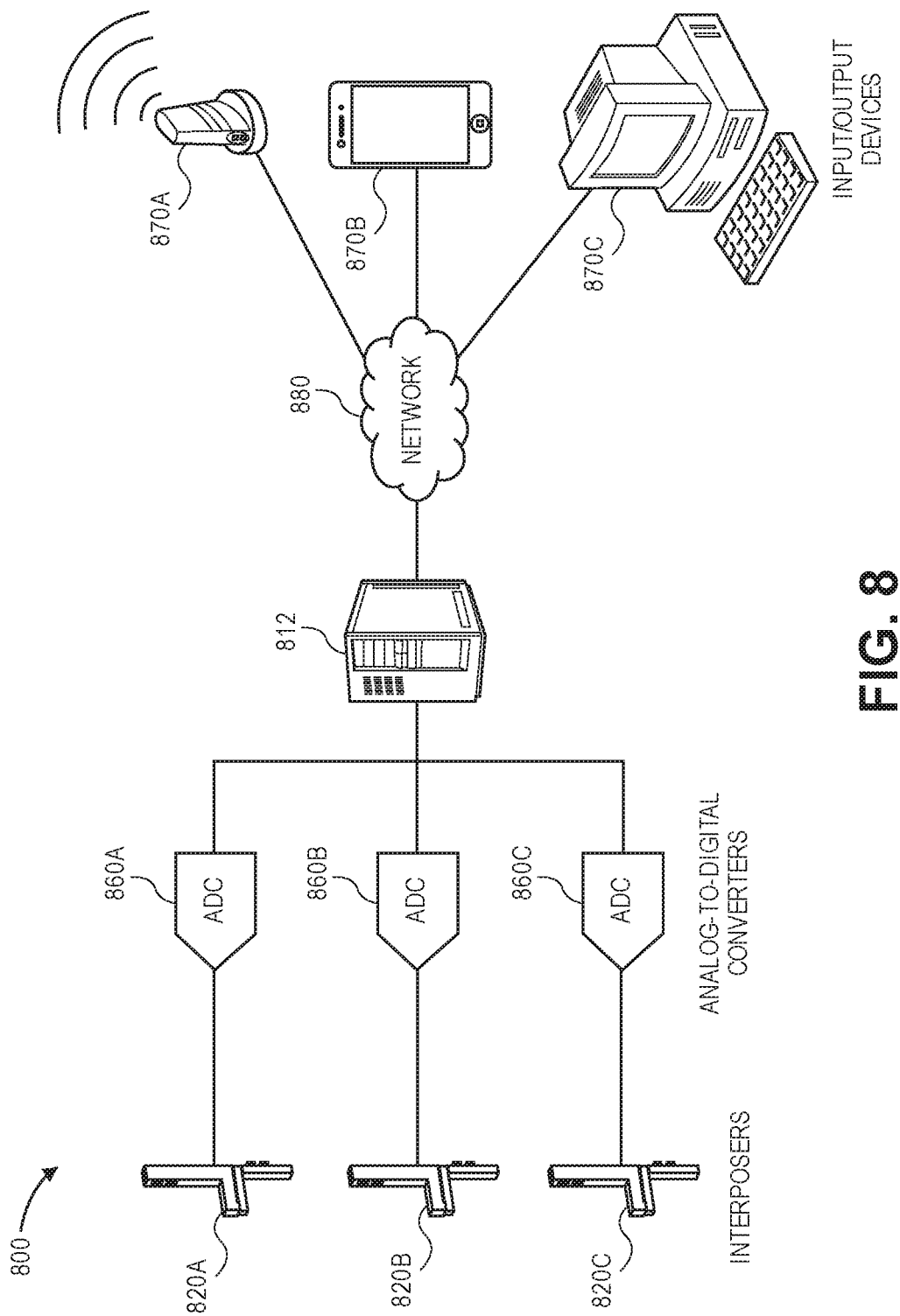
FIG. 8 is a diagram of components of one shelving system in accordance with implementations of the present disclosure

As is discussed above, items placed on or removed from a shelf or other like storage unit may be identified, and a location at which the items were placed or from which the items were removed, may be determined based on the loads sensed by a plurality of interposers having load cells disposed therein. Electrical load signals corresponding to such loads may be converted from analog to digital, if necessary, and transferred to a computing device for processing or analysis, or to one or more other computing devices for further consideration. Referring to FIG. 8, a diagram of components of one shelving system in accordance with implementations of the present disclosure is shown. Except where otherwise noted, reference numerals preceded by the number "8" shown in FIG. 8 indicate components or features that are similar to components or features having reference numerals preceded by the number "7" shown in FIGS. 7A through 7C, by the number "6" shown in FIGS. 6A through 6F, by the number "5" shown in FIG. 5, by the number "4" shown in FIGS. 4A through 4D, by the number "3" shown in FIGS. 3A and 3B, by the number "2" shown in FIGS. 2A through 2C, or by the number "1" shown in FIGS. 1A through 1D.

As is shown in FIG. 8, a shelving system 800 may include a plurality of interposers 820A, 820B, 820C that may be installed between storage units and support structures of a shelving system, thereby replacing a traditional interface between a storage unit or apparatus and a support structure to which the storage unit or apparatus is traditionally mounted, and enabling the interposers 820A, 820B, 820C to be incorporated into traditional storage units or apparatuses quickly, inexpensively and effectively. As is discussed above, each of the interposers 820A, 820B, 820C may include a plurality of load cells, e.g., strain-gage load cells, therein for sensing forces applied to the interposers 820A, 820B, 820C.

Each of the interposers 820A, 820B, 820C may be coupled with an analog-to-digital converter 860A, 860B, 860C. As is discussed above, a load cell may be configured to generate an analog signal (e.g., a voltage) corresponding to an extent of strain experienced by the load cell, and the analog-to-digital converters 860A, 860B, 860C may convert such signals to digital signals, and transfer the digital signals to a server 812 or other computing device. The analog-to-digital converters 860A, 860B, 860C may be of any type or form in accordance with the present disclosure, and may include one or more of a direct-conversion converter, a successive-approximation converter, a ramp-compare converter, an integrating converter, a sigma-delta converter, or any other analog-to-digital converter. Alternatively, in some embodiments, a plurality of interposers, such as the interposers 820A, 820B, 820C, may be coupled to a single, common analog-to-digital converter or like component for generating digital outputs in response to analog inputs.

The server 812 may be a server or any other component of a networked computer infrastructure for performing various computer-related functions associated with the placement of items on a shelf, or the removal of items from the shelf, the identification of items on the shelf, or the determination of locations of such items on the shelf. The server 812 may comprise or be in communication with one or more physical computer data stores (e.g., databases) or processors that may be provided in the same physical location as the interposers 820A, 820B, 820C, or in one or more alternate or virtual locations, e.g., in a "cloud"-based environment. The server 812 may implement or control one or more operations of a materials handling facility in which the interposers 820A, 820B, 820C are installed, and may connect or otherwise communicate with one or more other computer devices, including but not limited to input-output devices 870A, 870B, 870C, over the network 880 through the sending and receiving of digital data.

The network 880 may be any wired network, wireless network, or combination thereof, and may comprise the Internet in whole or in part. In addition, the network 880 may be a personal area network, local area network, wide area network, cable network, satellite network, cellular telephone network, or combination thereof. The network 880 may also be a publicly accessible network of linked networks, possibly operated by various distinct parties, such as the Internet. In some embodiments, the network 880 may be a private or semi-private network, such as a corporate or university intranet. The network 880 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The input-output devices 870A, 870B, 870C may be any computer devices configured to operate or provide access to one or more reporting systems for receiving or displaying information or data regarding operations in the materials handling facility, including but not limited to items placed on or removed from shelves, and may provide one or more interfaces for receiving interactions (e.g., text, numeric entries or selections) from one or more operators, users or workers in response to such information or data. The input-output devices 870A, 870B, 870C may be general purpose devices or machines, or dedicated devices or machines that feature any form of input and/or output peripherals such as scanners, readers, keyboards, keypads, touchscreens or like devices, and may further operate or provide access to one or more engines for analyzing the information or data regarding such operations, or the interactions received from the one or more operators, users or workers. For example, as is shown in FIG. 8, the input-output devices 870A, 870B, 870C may include a router or other like communication device, a smartphone, a desktop computer, or any other type of computing device.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The data and/or computer executable instructions, programs, firmware, software and the like (also referred to herein as "computer executable" components) described herein may be stored on a computer-readable medium that is within or accessible by computers or computer components such as the server 812 or the input-output devices 870A, 870B, 870C, or any other computers or control systems utilized in connection with a materials handling facility and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. Although some of the implementations of storage units and/or inventory areas disclosed herein may be implemented within a fulfillment center associated with an online marketplace, those of ordinary skill in the pertinent arts will recognize that the systems and methods of the present disclosure are not so limited, and may be utilized in connection with any items that are to be stored on a shelf provided in any environment or for any purpose.

For example, the interposers or like devices of the present disclosure may be provided in one or more chairs, e.g., between a main structural body of a chair and one or more casters mounted thereto, in order to determine when a loading or a load distribution thereon has changed. Likewise, interposers or like devices may be further installed on desks or tables, e.g., at their respective legs, to determine when one or more items has been placed on such desks or tables, removed from such desks or tables, or relocated on such desks or tables. Interposers or like devices may further be installed on traditional hangers for supporting coats, shirts or other articles of clothing, or on bars onto which such hangers may be suspended, in order to determine when an article of clothing or other object has been suspended from such bars, removed from such bars, or repositioned on such bars. One or more interposers or like devices may also be installed on or near wheel bearing assemblies of a vehicle, in order to determine when the vehicle has been loaded with persons or equipment, or where such persons or equipment have been loaded. The interposers or like devices, or methods for using such devices, disclosed herein may be utilized in any type or number of applications in accordance with the present disclosure.

Furthermore, although some other implementations of shelves, storage units and/or inventory areas of the present disclosure are referenced as providing support for discrete, homogenous items (e.g., in one or more dedicated locations or spaces on the shelves, such as lanes), those of ordinary skill in the pertinent arts will recognize that such storage units and/or inventory areas may accommodate any type, form or number of items, and in any location or space thereon, irrespective of any attribute or category of such items.

Moreover, those of ordinary skill in the pertinent arts will further recognize that any type, form or number of interposer may be provided singly or in tandem for the purpose of supporting one or more shelves or like units thereon. For example, although some of the implementations disclosed herein include single pairs of interposers, and for determining locations of items between the pairs of interposers based on the respective equilibrium forces sensed by each of the interposers, those of ordinary skill in the pertinent arts will recognize that two or more pairs of interposers may be utilized to provide support to shelves or like units in accordance with the present disclosure.

Furthermore, those of ordinary skill in the pertinent arts will further recognize that the interposers and shelves of the present disclosure need not be flat surfaces that are mounted to pegboards or like structural features of a materials handling facility, or like facility. Rather, implementations of the present disclosure may include surfaces provided at any angle (e.g., an easel-like structure) that are mounted to frames or structures for providing support in any manner. Such frames or structures need not include a discrete device including the sensors or other components disclosed herein per se, and are not limited in their application or implementation. As is discussed above, used herein, a "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose. Likewise, the systems and methods of the present disclosure may also be utilized outside of a traditional materials handling facility environment. For example, when utilized in a home, a plurality of storage units including shelves supported in accordance with the present disclosure may be installed in a kitchen, a pantry, a garage, a shed or a work area, to support items thereon and track their respective arrival or departure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations.

For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An interposer assembly comprising:
a shelf connector comprising a first vertical extension and a cantilever arm, wherein the first vertical extension comprises a first slot and a second slot vertically co-aligned on a front face of the first shelf connector, wherein the first slot and the second slot are separated by a predetermined vertical distance;
a support connector comprising a second vertical extension, wherein the second vertical extension comprises a first hook and a second hook vertically co-aligned on a rear face of the support connector, and wherein the first hook and the second hook are separated by the predetermined vertical distance; and
a load cell disposed between the shelf connector and the support connector, wherein the cantilever arm is in contact with the load cell.

2. The interposer assembly of claim 1, wherein at least the load cell is in communication with a computer system programmed with instructions that, when executed, cause the computer system to perform a method comprising:
receiving a first load signal from the load cell at a first time;
receiving a second load signal from the load cell at a second time;
identifying an item based at least in part on a difference between the first load signal and the second load signal; and
updating an inventory record to indicate that a number of the item was increased or decreased after the first time and not later than the second time.

3. The interposer assembly of claim 2, wherein the load cell is configured to generate an analog load signal corresponding to a load applied to the cantilever arm,
wherein the first load signal is a digital equivalent of an analog load signal generated by the load cell at the first time, and
wherein the second load signal is a digital equivalent of an analog load signal generated by the load cell at the second time.

4. A first interposer assembly comprising:
a first frame having at least a first protrusion extending from at least a first face of the first frame; and
a first load cell,
wherein the first load cell is configured to generate at least one load signal corresponding to a load applied to at least a portion of the first interposer assembly comprising a first opening on at least a second face of the first frame,
wherein at least one dimension of the first protrusion corresponds to at least one dimension of the first opening, and
wherein the at least one dimension of the first protrusion corresponds to at least one dimension of at least one opening of a support structure.

5. The first interposer assembly of claim 4, wherein the first frame is formed from one or more of a plastic, a rubber or a metal,
wherein the first load cell is disposed within a first cavity of the first frame, and
wherein the first load cell is a strain-gage load cell comprising at least one conductive element that varies in electrical resistance in response to the load applied to at least the portion of the first interposer assembly.

6. The first interposer assembly of claim 4, wherein the first protrusion is one of a hook, a peg or a pin, and
wherein each of the first opening and the at least one opening of the support structure is one of a hole, a slot or a receptacle configured to receive the one of the hook, the peg or the pin therein.

7. The first interposer assembly of claim 4, wherein the first frame further comprises a second protrusion extending from at least the first face of the first frame,
wherein the portion of the first interposer assembly further comprises a second opening on at least the second face of the first frame, and
wherein the at least one dimension of the first protrusion corresponds to the at least one dimension of the first opening and at least one dimension of the second opening.

8. The first interposer assembly of claim 4, further comprising a first shelf connector comprising a first vertical extension having at least a first opening and a first cantilevered arm,
wherein the first load cell is disposed between the first frame and the first cantilevered arm,
wherein the first protrusion defines an external shape,
wherein each of the first opening of the first vertical extension and the at least one opening of the support structure defines a common internal shape, and
wherein the common internal shape is configured to releasably accommodate the external shape therein.

9. The first interposer assembly of claim 4, wherein the first frame comprises a first shelf mounting section and a first support mounting section,
wherein the first load cell is an S-shaped strain-gage load cell disposed below the first shelf mounting section and above the first support mounting section,
wherein the first protrusion extends from a rear face of the first support mounting section,
wherein the first shelf mounting section comprises a first opening in a front face of the first shelf mounting section,
wherein the first protrusion defines an external shape,
wherein each of the first opening in the front face of the first shelf mounting section and the at least one opening of the support structure defines a common internal shape, and
wherein the common internal shape is configured to releasably accommodate the external shape therein.

10. The first interposer assembly of claim 4, wherein the first frame comprises a first shelf mounting section and a first support mounting section, wherein the first load cell is an S-shaped strain-gage load cell disposed between the first shelf mounting section and the first support mounting section, wherein the first protrusion extends from a rear face of the first support mounting section, wherein the first shelf mounting section comprises a first opening in a front face of the first shelf mounting section, wherein the first protrusion defines an external shape, wherein each of the first opening in the front face of the first shelf mounting section and the at least one opening of the support structure defines a common internal shape, and wherein the common internal shape is configured to releasably accommodate the external shape therein.

11. The first interposer assembly of claim 4, wherein the first load cell is suspended below the first frame, wherein the first load cell comprises a first platform aligned substantially perpendicular to the at least one face of the first frame, and wherein the first load cell is configured to generate the at least one load signal corresponding to the load applied to at least the first platform of the first load cell.

12. The first interposer assembly of claim 4, wherein the first load cell is configured to generate the at least one load signal corresponding to a first load applied to a first portion of the first load cell by a first portion of a platform, wherein the first interposer assembly further comprises:
a second load cell configured to generate at least one load signal corresponding to a second load applied to at least a first portion of the second load cell by a second portion of the platform, wherein the first frame further comprises a second protrusion extending from at least the first face of the first frame, and wherein at least one dimension of the second protrusion corresponds to the at least one dimension of the at least one opening of the support structure.

13. A system comprising:
the first interposer assembly of claim 4; and
a computer system in communication with at least the first interposer assembly,
wherein the computer system is programmed with instructions that, when executed by the computer system, cause the computer system to perform a method comprising:
receiving, from the first load cell, a first load signal at a first time;
receiving, from the first load cell, a second load signal at a second time;
determining a first difference between the first load signal and the third load signal;
identifying an item based at least in part on the first difference; and
in response to identifying the item,
updating an inventory record to indicate an increase or a decrease of one of the item as of the second time.

14. The system of claim 13, further comprising:
a second interposer assembly comprising:
a second frame having at least a second protrusion extending from at least a second face of the second frame; and
a second load cell,
wherein the second load cell is configured to generate at least one load signal corresponding to a load applied to at least a portion of the second interposer assembly, and
wherein at least one dimension of the second protrusion corresponds to the at least one dimension of the at least one opening of the support structure, and
wherein the method further comprises:
receiving, from the second load cell, a third load signal at the first time;
receiving, from the second load cell, a fourth load signal at the second time; and
determining a second difference between the third load signal and the fourth load signal,
wherein the item is identified based at least in part on the first difference and the second difference.

15. The first interposer assembly of claim 4, wherein the support structure is at least a portion of a gondola shelving unit, a pegboard, a cabinet, a chair, a desk, a table or a vehicle.

16. A first interposer assembly comprising:
a first frame having at least a first protrusion extending from at least a first face of the first frame; and
a first load cell,
wherein the first load cell is configured to generate at least one load signal corresponding to a load applied to at least a portion of the first interposer assembly,
wherein at least one dimension of the first protrusion corresponds to at least one dimension of at least one opening of a support structure, and
wherein the support structure is at least a portion of a gondola shelving unit, a pegboard, a cabinet, a chair, a desk, a table or a vehicle.

17. A system comprising:
a first interposer assembly comprising a first loading surface, a first load cell, and a first protrusion, wherein the first protrusion is configured for releasable insertion into at least a first opening of a first structural support; and
a second interposer assembly comprising a second loading surface, a second load cell, and a second protrusion, wherein the second protrusion is configured for releasable insertion into at least a second opening of a second structural support; and
a computer system in communication with at least the first load cell and the second load cell.

18. The system of claim 17, wherein the computer system is programmed with one or more sets of instructions that, when executed, cause the computer system to at least:
receive a first load signal corresponding to a first load on the first load cell at a first time;
receive a second load signal corresponding to a second load on the first load cell at a second time;
receive a third load signal corresponding to a third load on the second load cell at the first time;
receive a fourth load signal corresponding to a fourth load on the second load cell at the second time;
determine a weight of at least one item based at least in part on:
a first difference between the first load and the second load; and
a second difference between the third load and the fourth load;
identify the at least one item based at least in part on the weight; and update an inventory record to indicate that a number of the item was increased or decreased after the first time and not later than the second time.

19. The system of claim 18, wherein the first loading surface is configured to contact a first portion of a platform, wherein the second loading surface is configured to contact a second portion of the platform, and
wherein the method further comprises:
   determining a location on the platform based on at least one of the first difference or the second difference, wherein determining the location of the item on the surface of the shelf comprises at least one of:
   determining a first distance between the second load cell and the location on the platform based at least in part on the second difference, the weight and a predetermined distance between the first load cell and the second load cell; or
   determine a second distance between the first load cell and the location on the platform based at least in part on the first difference, the weight and the predetermined distance,
   wherein the inventory record is updated to indicate that the at least one item was deposited on the location on the platform or removed from the location on the platform.

20. The system of claim 17, wherein the first structural support and the second structural support are associated with one of a gondola shelving unit, a pegboard, a cabinet, a chair, a desk, a table or a vehicle.

* * * * *